United States Patent [19]
Watson et al.

[11] Patent Number: 5,659,520
[45] Date of Patent: Aug. 19, 1997

[54] SUPER SHORT BASELINE NAVIGATION USING PHASE-DELAY PROCESSING OF SPREAD-SPECTRUM-CODED REPLY SIGNALS

[75] Inventors: Marvin Lee Watson; Bretton Lee Douglas, both of Santa Barbara; Chester DeWitt Loggins, Jr., Summerland; Reginald John Cyr, Santa Barbara; Donald Owen Norris, Jr., Santa Barbara; Michael Paul Wapner, Santa Barbara, all of Calif.

[73] Assignee: Sonatech, Inc., Santa Barbara, Calif.

[21] Appl. No.: 426,957

[22] Filed: Apr. 24, 1995

[51] Int. Cl.$^6$ ........................................................ G01S 3/80
[52] U.S. Cl. ........................ 367/125; 367/124; 367/127; 342/146
[58] Field of Search ........................... 367/6, 99, 118, 367/123, 124, 125, 127, 129; 342/146

[56] References Cited

U.S. PATENT DOCUMENTS

| | | | |
|---|---|---|---|
| 3,432,851 | 3/1969 | Cox, Jr. et al. | 367/6 |
| 4,176,338 | 11/1979 | Spindel et al. | 367/6 |
| 4,590,591 | 5/1986 | Leroy et al. | 367/6 |
| 4,914,642 | 4/1990 | Fraser et al. | 367/122 |
| 5,309,409 | 5/1994 | Jones et al. | 367/103 |

OTHER PUBLICATIONS

Geyer et al., "Acoustic Beacon–Aided Navigation in the Deep Ocean", Conf. IEEE 1978 Position Location and Navigation Symposium, San Diego, Ca., pp. 225–230 Nov. 1978.

*Primary Examiner*—Ian J. Lobo
*Attorney, Agent, or Firm*—Ladas & Parry

[57] ABSTRACT

A short baseline navigation system employs the real-time estimation of the positions of multiple cooperative targets. Each target replies with a unique stepped frequency sequence signal that covers the usable frequency band. A processor operates on reply signals received by elements on the tracking platform and develops a coarse time-difference-of-arrival estimate using an algorithm derived herein. The processor also estimates the Doppler shift of received signals, and determines a time-window (or gating) that eliminates the portions of the received signals corrupted by multipath interference. The relative phase differences between the received signals are then used in conjunction with the coarse time-difference-of-arrival estimates for a precise direction-of-arrival estimation.

13 Claims, 27 Drawing Sheets

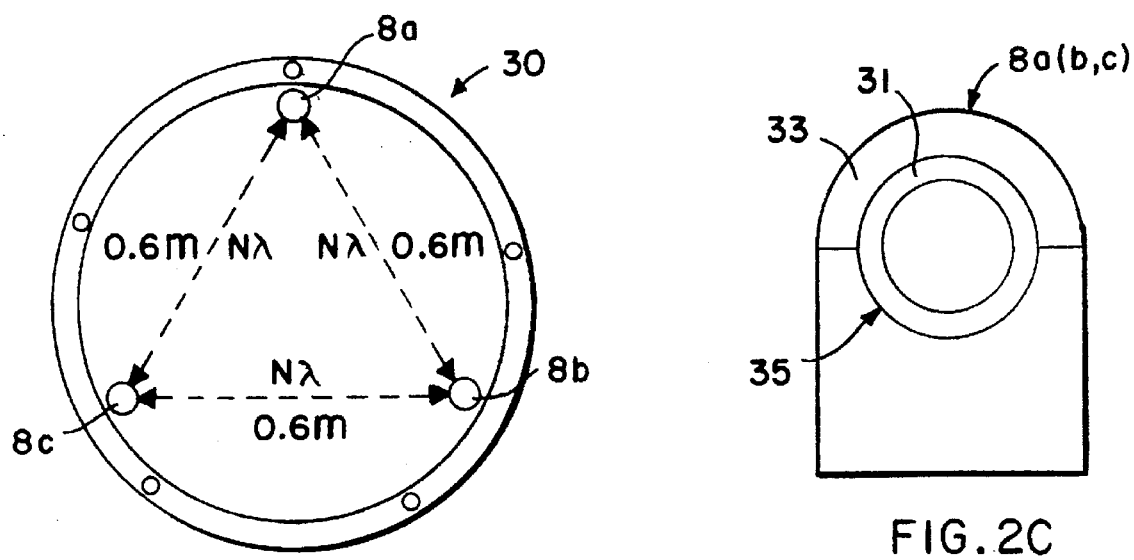
FIG. 2A
FIG. 2C
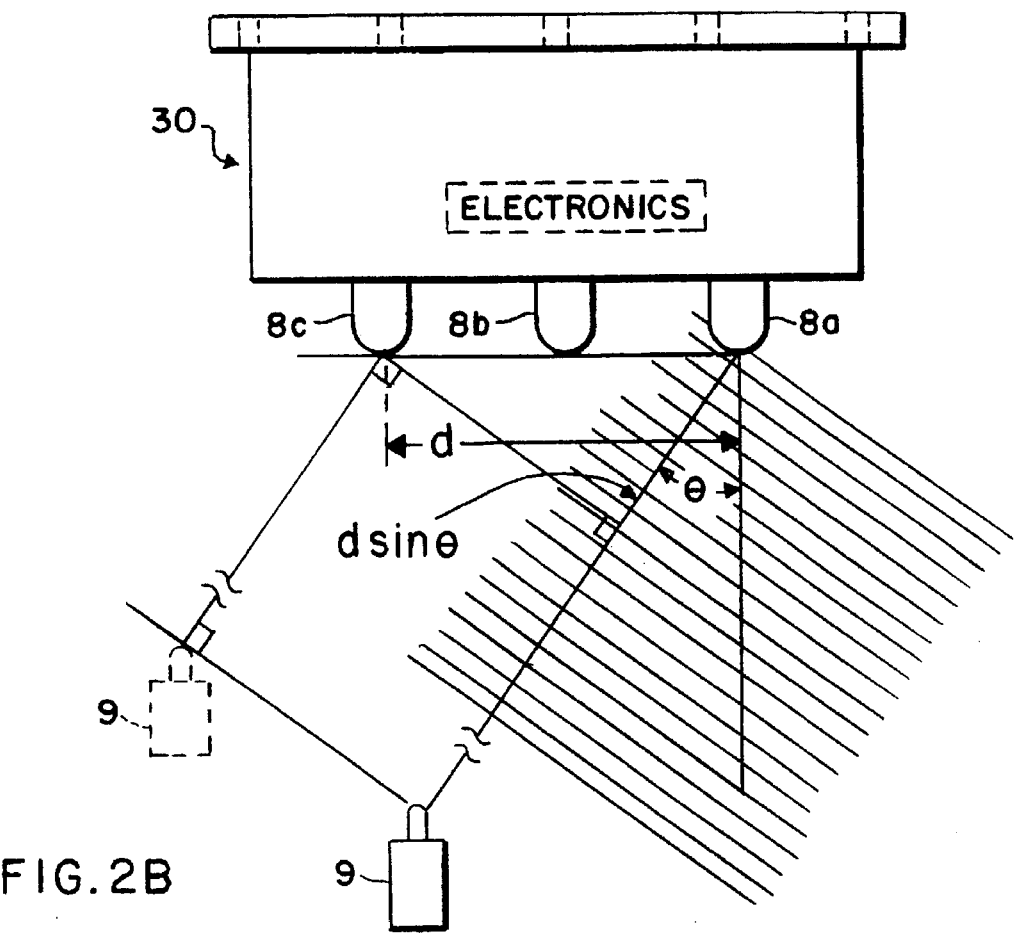
FIG. 2B

SUPER SHORT BASELINE NAVIGATION USING PHASE-DELAY PROCESSING OF SPREAD-SPECTRUM-CODED REPLY SIGNALS

BACKGROUND OF THE INVENTION

1. Field of the Invention

This invention relates to the field of acoustic navigation systems, and more particularly relates to a system of this type having improved accuracy over short-baseline and super-short-baseline navigation systems.

2. Brief Description of the Prior Art

The objective of navigation is to estimate, in real-time, the position, relative to a tracking platform, of one or more cooperative targets in a known reference frame. Navigation systems estimate the positions of targets by measuring the round-trip time delay between the transmission of an interrogation pulse from the tracking platform and the reception of reply signals (by hydrophones at the tracking platform) from the interrogated, cooperative target. Acoustic navigation systems are typically categorized into three groups: long-; short-; and super-short-baseline configurations. The difference is associated with the distance between the elements receiving reply signals from the object/target being tracked/located. Long-baseline systems typically involve sensors placed hundreds to thousands of feet separated on the ocean bottom. Platform-based navigation has conventionally been performed in one of two ways: short-baseline (SBL) navigation; and super-short-baseline (SSBL) navigation.

In short-baseline navigation, receiver elements, i.e. hydrophones, are mounted in different locations on the platform. The spacing between receiver elements is typically tens or hundreds of wavelengths at the signal frequency. In underwater acoustic navigation, the tracking platform is typically a surface ship or a submarine. In radar navigation, the platform may be a ship, a land vehicle, or an airplane. In satellite navigation, the earth itself is the usual reference platform. The short-baseline platform receiver elements detect replies from cooperative targets and convert the signals into a form that can be processed by the navigation system processor. The processor determines the relative time delay between signal arrivals at the different receiver elements. The position of each target, relative to the platform, is then calculated from the time-difference-of-arrival (TDOA) estimates. The cooperative target sometimes use a spread-spectrum reply signal to allow for a more precise measurement of time-delay.

For super-short-baseline (SSBL) navigation, all the receiver elements are mounted in an array where the separation is less than one-half the wavelength at the reply signal frequency. The direction-of-arrival is determined by calculating the relative phase difference between the received hydrophone signals. Since the elements in the hydrophone array are separated by one-half wavelength or less, the phase differences are less than one half cycle, and each phase difference can be directly converted to a time difference without ambiguity. The position of the cooperative target is then estimated from the time differences. This type of navigation system is popular, because the small array requires very little space for installation. The accuracy of super short baseline navigation is limited, however, because the baseline lengths are so short. Small errors in the phase differences used to estimate time-delay result in large errors in the direction-of-arrival estimate. In addition, the elements of the super-short-baseline array are in such close proximity that they may shadow each other for certain signal arrival directions.

The position estimation performance of each of these techniques depends upon the accuracy of the time-difference-of-arrival estimation. For short baseline navigation, the time-difference-of-arrival is estimated by cross-correlating each pair of received signals. Burdick states in "Underwater Acoustic Systems Analysis, second edition, pg. 383, that the variance of a time-delay estimate $\sigma_\tau$ is bounded below by the following formula:

$$\sigma_\tau^2 = \frac{1}{\left(2\frac{E}{N_o}\beta_o^2\right)}$$

where E is the signal energy, $N_0$ is the noise spectral density, and $\beta_0$ is the RMS signal bandwidth. This equation shows that to minimize the variance, it is desirable to use a wide bandwidth signal with high energy (high power and long duration to maximize the energy).

For super-short-baseline navigation, the time-difference-of-arrival is obtained by estimating the relative phase between each pair of channels. For a continuous wave (CW) pulse, the variance in the phase estimate $\sigma_\phi$ is bounded below by the following formula:

$$\sigma_\phi^2 = \left[\frac{2E}{N_o}\right]^{-1}$$

Provided there is no phase ambiguity, the standard deviation of the phase estimate is converted into a standard deviation in the time-delay estimate $\sigma_{\tau_\phi}$ by the following formula:

$$\sigma_{\tau_\phi} = \frac{\sigma_\phi}{2\pi f_c} = \frac{1}{\sqrt{\frac{2E}{N_o}}\, 2\pi f_c}$$

where $f_c$ is the carrier frequency of the CW pulse. These lower bounds on time-difference-of-arrival estimation correspond to the following RMS bearing estimation errors for the direction-of-arrival $\theta$.

Cross-Correlation-Based Error in Bearing Estimate

The standard deviation of the bearing estimate $\sigma_\theta$ using cross-correlation-based techniques is:

$$\sigma_\theta = \frac{1}{\sqrt{\frac{2E}{N_o}}\,\beta_o}\,\frac{d}{c}$$

where d is the separation between receiver elements, and c is the speed of wave propagation in the medium.

Phase-Difference-Based Error in Bearing Estimate

The standard deviation of the bearing estimate $\sigma_\theta$ obtained using a phase-difference-based technique is:

$$\sigma_\theta = \frac{1}{\sqrt{\frac{2E}{N_o}}\, 2\pi f_c}\,\frac{d}{c}$$

The carrier frequency is always larger than the RMS bandwidth, so the standard deviation in bearing angle obtained with the phase difference technique is always smaller than that obtained with the cross-correlation-based technique. However, when any pair of elements is separated by more than one-half wavelength, the phase difference is ambiguous (by $\pm 2\pi$, $\pm 4\pi$, etc) and products an ambiguous time-difference-of-arrival. This phase ambiguity must be resolved before the phase difference can be used for precise time-delay estimation.

To derive accurate position estimates, besides the appropriate phase and time differences, one also must know the signal propagation speed very accurately. The relative motion between the tracking platform and the targets must also be known. For good signal quality, the received signals must be properly gated (windowed) to eliminate signal contamination by multipath signal reception, which will otherwise produce erroneous bearing estimates.

The propagation speed of the signal is an important parameter, because it is used in converting the time-difference-of-arrival estimate into a direction-of-arrival estimate θ using the following formula:

$$\theta = \arcsin\left[\frac{\Delta\tau}{d/c}\right]$$

For small angles, a relative error in propagation speed corresponds to the same relative error in the direction-of-arrival estimate. Target and receiver motion in the propagating medium will affect the time-difference-of-arrival estimates and the perceived frequency of the received signals. When the phase difference estimation is converted into a time-difference-of-arrival estimate, the received carrier frequency must be precisely known.

Multipath signals degrade the performance of short-baseline systems when they overlap in time with the direct-path signals. The direct-path reply signal will arrive at the receiver first, and for some interval of time will be the only signal received. Later, the first reflected-path signal will arrive and interfere with the direct-path signal. If the data, during the time period of interference, is used to estimate a single direction-of-arrival, it will be in error, because two or more signals were arriving from different angles during that time period.

SUMMARY OF THE INVENTION

The present invention offers improved accuracy over both short baseline navigation and super-short-baseline navigation. The system consists of a single projector and a multiple element receiver array where the receiver elements are spaced more than one-half wavelength apart.

The projector provides a means to transmit a wide beam interrogate signal to a set of transponders or responders. In this description hereinafter, a transponder interrogator/reply device will be used as exemplary. It is to be understood, however, that transponders, or responders, or combinations of transponders and responders may comprise a complete navigation system.

The transponders have means to detect the interrogate signal. Upon detection of the interrogate signal, the transponders reply with a train of pulses. Each transponder has a unique train of tonal pulses. The reply signals are detected on the receiver array of receiver elements for further processing in respective receiver channels. The tonal pulses of each frequency are narrow-band filtered and processed separately to improve the signal-to-noise ratio. The set of narrow band signals are then cross-correlated, in a manner known in the art by the average skilled worker, for each pair of receiver elements/channels to obtain a time-difference-of-arrival estimate. This estimate is then used as a coarse time-difference-of-arrival estimate to resolve ambiguities between each pair of receiver elements in a separate precision phase comparison process. After the phase ambiguity has been resolved, a precise time-difference-of-arrival estimate is obtained by estimating the phase difference between signals in each pair of receiver channels. When the signal-to-noise ratio is sufficiently high, the time-difference-of-arrival estimate obtained using this technique has the same precision as the time-difference-of-arrival estimate obtained using phase correlation in the conventional super-short-baseline navigation technique. However, because this system uses a longer baseline, the direction-of-arrival estimates are more precise. The resulting target position estimate is thus more precise than that obtained with previously known techniques.

The precise time-difference-of-arrival estimates between each pair of receiver channels are converted into wave vectors (to be discussed in detail hereinafter) and direction-of-arrival estimates for each target being tracked. The direction-of-arrival estimates are used with the estimates of signal velocity in the medium and round-trip travel time to determine the position of each target relative to the short baseline array. This relative position is then used with array position and attitude information to obtain an estimate of each target's geodetic position.

The system, according to a preferred embodiment of the invention, consists of a three (or more) element hydrophone array with the elements spaced 0.5 to 20 wavelengths apart. The simplest such embodiment is arranged with the elements spaced 5 to 10 wavelengths apart in an equilateral triangle. A projector transducer located near the array of receiver elements transmits an interrogate pulse to the cooperative targets. Each cooperative target replies with a series of gated-CW pulses of different frequencies. The reply pulses from the targets are received in the hydrophone array and narrowband filtered separately to improve the signal-to-noise ratio. The pulses at each frequency are cross-correlated and summed to form a time-delay estimate. Cross-correlating the time-delay estimates for a number of gated-CW pulses of different frequencies results in a smaller variance than the time-delay estimate obtained from the same number of chirp pulses.

The time-delay estimate obtained from the set of CW pulses is treated as a coarse time-delay estimate. The relative phase between each pair of hydrophone channels at each frequency is then calculated to determine a more precise time-delay estimate for each frequency. The precise time-delay estimates are ambiguous, however, because the hydrophone separation is more than one half wavelength and preferably several wavelengths, so the relative time-delay between signals received on different hydrophones may be several periods of the carrier frequency. The ambiguity is removed by adding or subtracting an integral number of periods to the precise phase-based time-delay estimates until they agree with the coarse time-delay estimate.

When the signal-to-noise ratio is sufficiently high, the precise phase-based time-delay estimates will have the same variance as the time-delay estimates obtained using the super short baseline navigation technique. However, because the preferred baseline length is 5 to 10 times that of the conventional super short baseline array, the direction-of-arrival estimates are 10 to 20 times more accurate.

BRIEF DESCRIPTION OF THE DRAWINGS

FIGS. 2A–2C illustrate one type of receiver array that can be used; FIG. 2A is a bottom view, and FIG. 2B shows a side view.

DETAILED DESCRIPTION OF THE INVENTION

Figure 1:
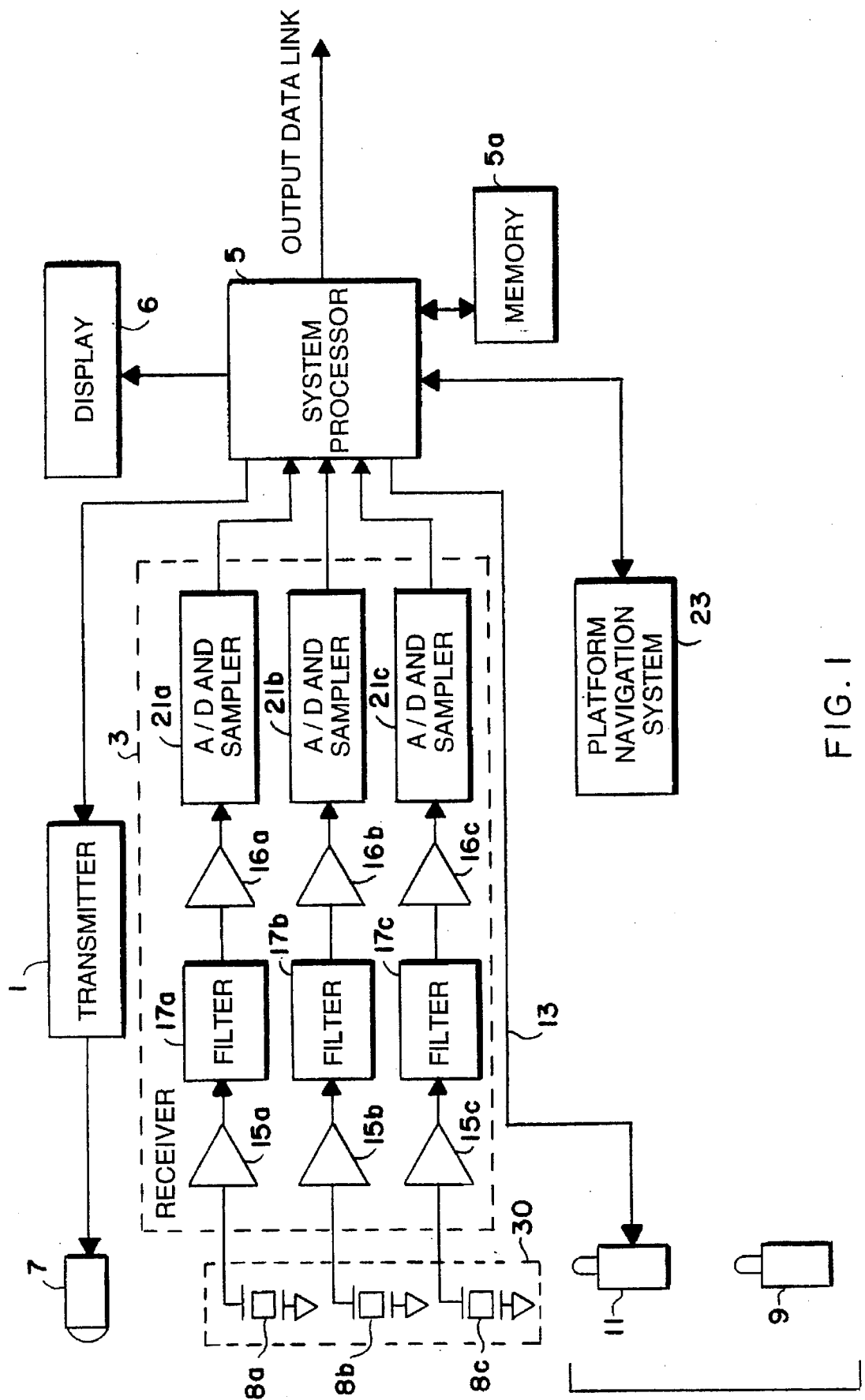
FIG. 1 shows a block diagram of the short-baseline platform transmitter/receiver system according to the present invention.

FIG. 1 shows a block diagram of the platform hardware associated with this invention. The transmitter 1 and receiver 3 are controlled by the system processor 5. The transmitter 1 sends an interrogate signal to the projector 7. The projected pulse is detected by every transponder 9 within the system's operating range. The transponder 9 replies with a set of stepped-frequency CW (continuous wave) pulses which are converted to voltages by the receiver elements 8a–8c of element receiver array 30 and processed in separate receiver channels by receiver 3.

An alternate method of data acquisition which is useful for tethered targets employs a responder 11. In this case, the processor 5 sends an interrogate signal in the form of an electrical or optical pulse down a tether 13 to the responder 11. The responder 11 replies with a series of CW pulses which are also detected and processed by the receiver array 30 and receiver 3.

In the receiver channels, the voltages generated by the receiver elements 8a–8c are amplified by preamplifiers 15a–15c, narrowband filtered by filters 17a–17c, amplified by time-varying gain (TVG) amplifiers 16a–16c, and sampled and converted from analog to digital format by the analog-to-digital (A/D) converters 21a–21c. TVG is utilized to normalize system gain to correct for time varying acoustic reverberation. The resulting data is stored in memory 5a and can be accessed by the system processor 5.

The system processor performs the algorithms necessary to estimate the position of each target 9, 11 in the platform's reference frame. The data from the platform navigation system 23 provides the processor 5 with the platform's geodetic position and orientation. This data is then used to translate the position of each target 9, 11 in the platform's reference frame to a target geodetic position.

FIGS. 2A–2C show a physical layout and construction of a hydrophone receiver array 30 of receiving elements 8a, b, and c. The preferred embodiment of FIG. 2A employs (but is not limited to) three receiver elements 8a–8c, where the receiver element spacing is greater than one half wavelength of the lowest frequency received. When the direction-of-arrival is perpendicular to the plane containing the elements, the arrival angle, $\theta$ (FIG. 2B), is zero, and all the receiver elements 8a–8c receive the transponder signals at the same time. When the arrival angle, $\theta$, is nonzero, the path length difference for two elements separated by d (FIG. 2B) is $$d \sin \theta$$

The path length difference corresponds to a time-difference-of-arrival $T_d$ of $$T_d = (d \sin \theta)/c$$

where c is the speed of propagation in the medium. When narrowband signals are used, the path length difference corresponds to a phase difference $\phi_{1,2}$ between two receiver channels of $$\phi_{1,2} = 2\pi(d \sin \theta)/\lambda$$

where $\lambda$ is the wavelength of propagation in the medium. The time-difference-of-arrival can be obtained from the phase difference by the following equation:

$T_d = \phi_{1,2}/(2\pi f)$ where f is the frequency of the received signal. Acoustic navigation systems obtain direction-of-arrival estimates by estimating the time-difference-of-arrival between receiver channels, then estimating the angle of arrival by the following formula:

$\theta = \arcsin(cT_d/d)$

Figure 3:
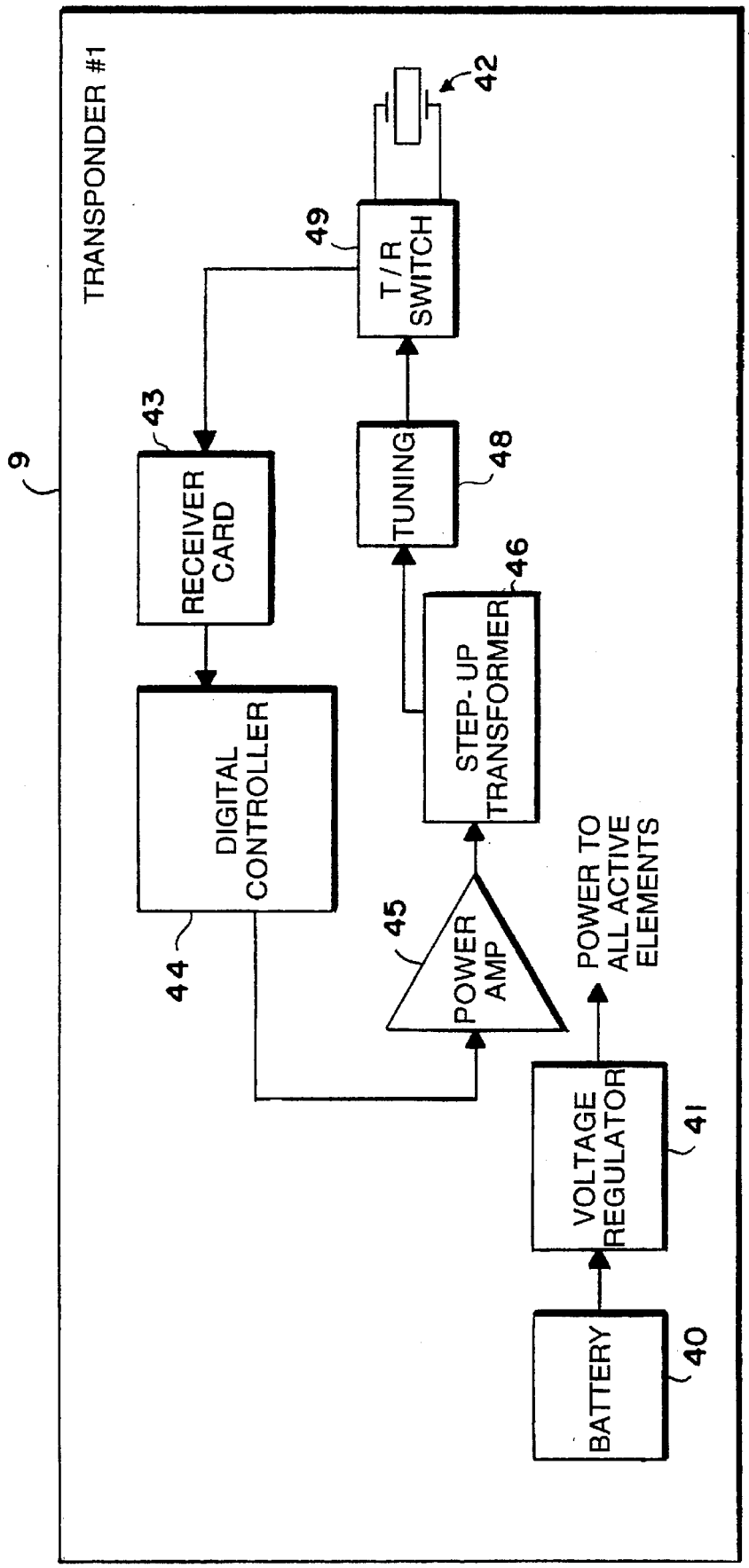
FIG. 3 shows a block diagram of the transponder which generates the stepped-frequency reply signals.

FIG. 3 shows a block diagram of a transponder 9. The transponder 9 will receive an interrogate signal through the wave propagation medium in the form of an interrogate frequency burst, or pulse. For an acoustic transponder, reception will occur at a transducer 42. For a responder, as noted supra, the interrogate signal will pass down a cable in the form of an electrical or optical pulse. The interrogate signals are detected in a receiver shown in FIG. 3 as a receiver card 43, and passed on as digital pulses to a digital controller 44. The digital controller 44 responds to interrogate signals by transmitting a series of stepped frequency CW pulses. To do this, the controller 44 sends a set of CW pulses to a power amplifier 45 which increases the power of the CW reply signals generated by digital controller 44. The reply signal voltage output of power amplifier 45 is increased by a step-up transformer 46. The transformer 46 output is then matched with the transducer 42 by a tuning network 48, and the high-voltage reply signals are routed to the transducer 42 by a transmit/receive (T/R) switch 49, which protects the receiver electronics 43 from the large voltages being applied to the transducer 42 during reply transmission.

Figure 4A:
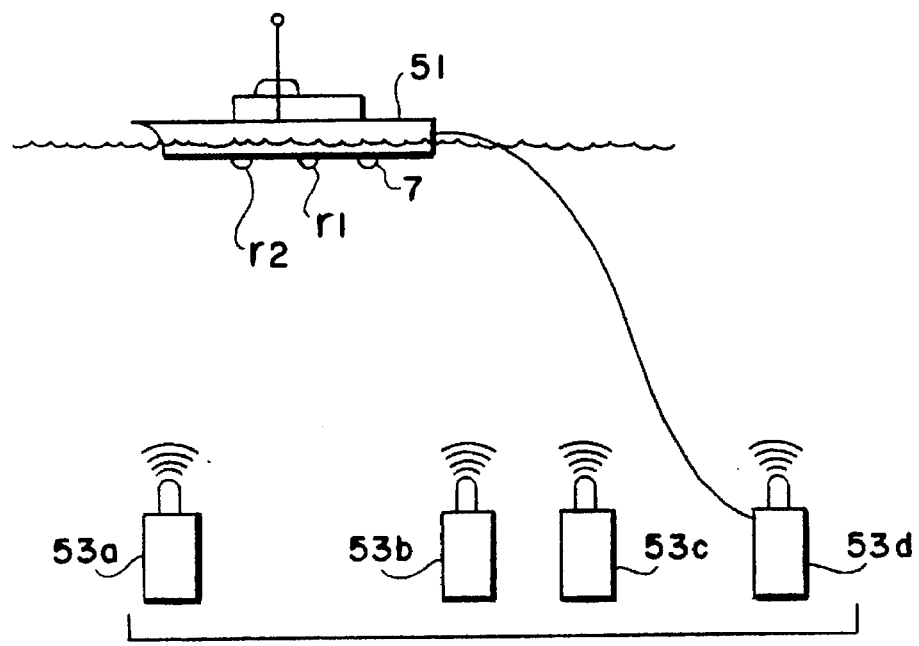
FIGS. 4A–4C show a schematic representation of a survey ship in 4A; various transponders and responders; the reply signal set for a transponder or responder capable of multiple-frequency replies in FIG. 4B; and different pulse sequences for multiple responder/transponder devices in FIG. 4C.
Figure 4B:
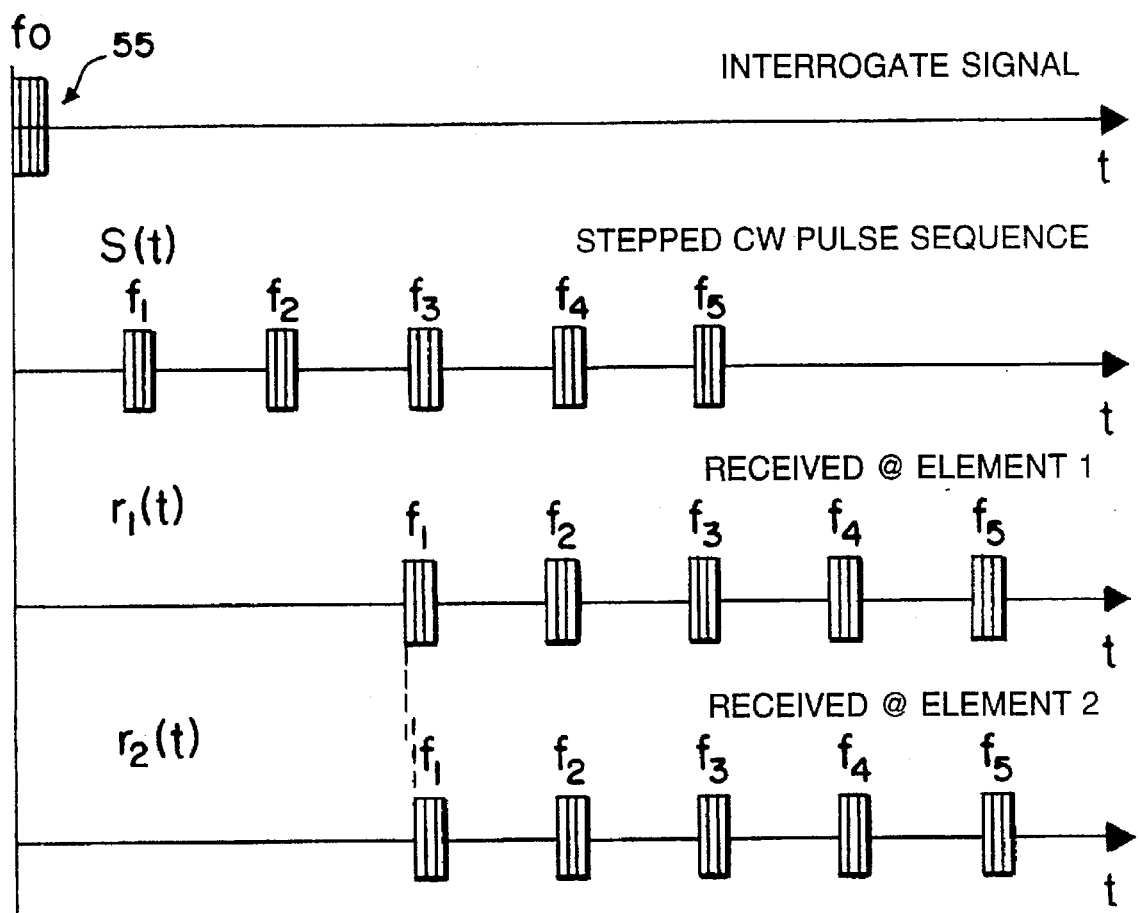
Figure 4C:
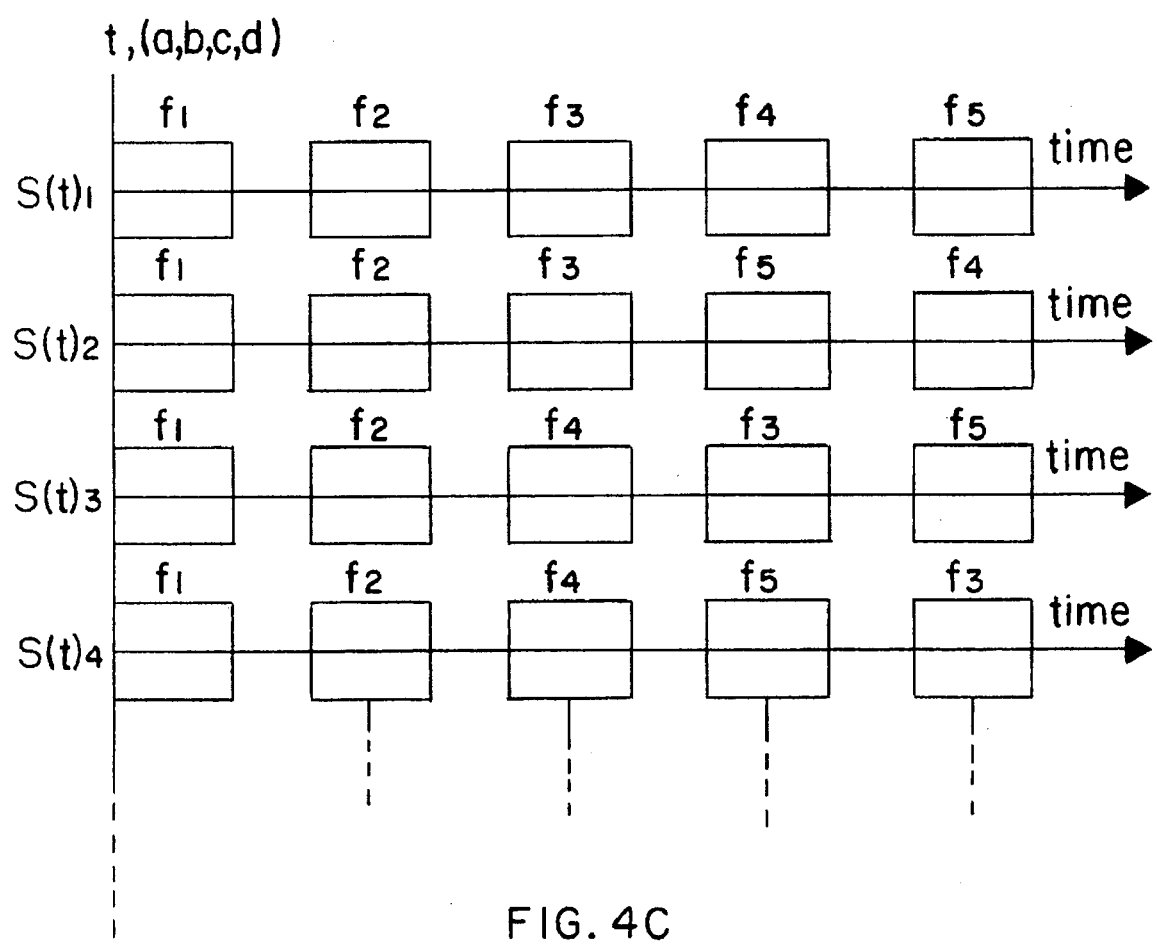

FIGS. 4A–4C show examples of the interrogate signal 55 issued from a survey ship 51 and the reply signal set from a transponder or responder. A projectors on the reference platform will transmit a single interrogate pulse 55 to a transponder 53a–c, or send an interrogate pulse 55 down a cable 13 to a responder 53d. Each transponder 53a–c or responder 53d replies with a stepped CW pulse sequence S(t), i.e., a series of CW pulses of different frequencies as shown in FIG. 4B. The signal S(t) from each transponder/responder is received by receiving elements r1 and r2 on the ships reference platform and are seen in a relative time relationship in FIG. 4B as r1(t) and r2(t), respectively. The lead pulse in each series is at a common frequency $f_1$ for all transponders 53a–c and responders 53d. FIG. 4C shows four sets of reply signals S(t)1–S(t)4 from four different transponders/responders. Each set of signals consists of a series of CW pulses. The order of frequencies $f_1$–$f_5$, for example 20 KHz, 21 KHz, 22 KHz, 23 KHz, and 24 KHz, in each pulse train S(t)1–S(t)4 is unique for each transponder and responder, so each transponder 53a–c and responder 53d to be tracked is identified by its own unique permutation of reply frequencies. The schematic representation of signals S(t)1–S(t)4 shown in FIG. 4C does not show relative timing differences. This figure is provided to show only the distinctive frequency pulse sequences as between transponders/responders.

Figure 5:
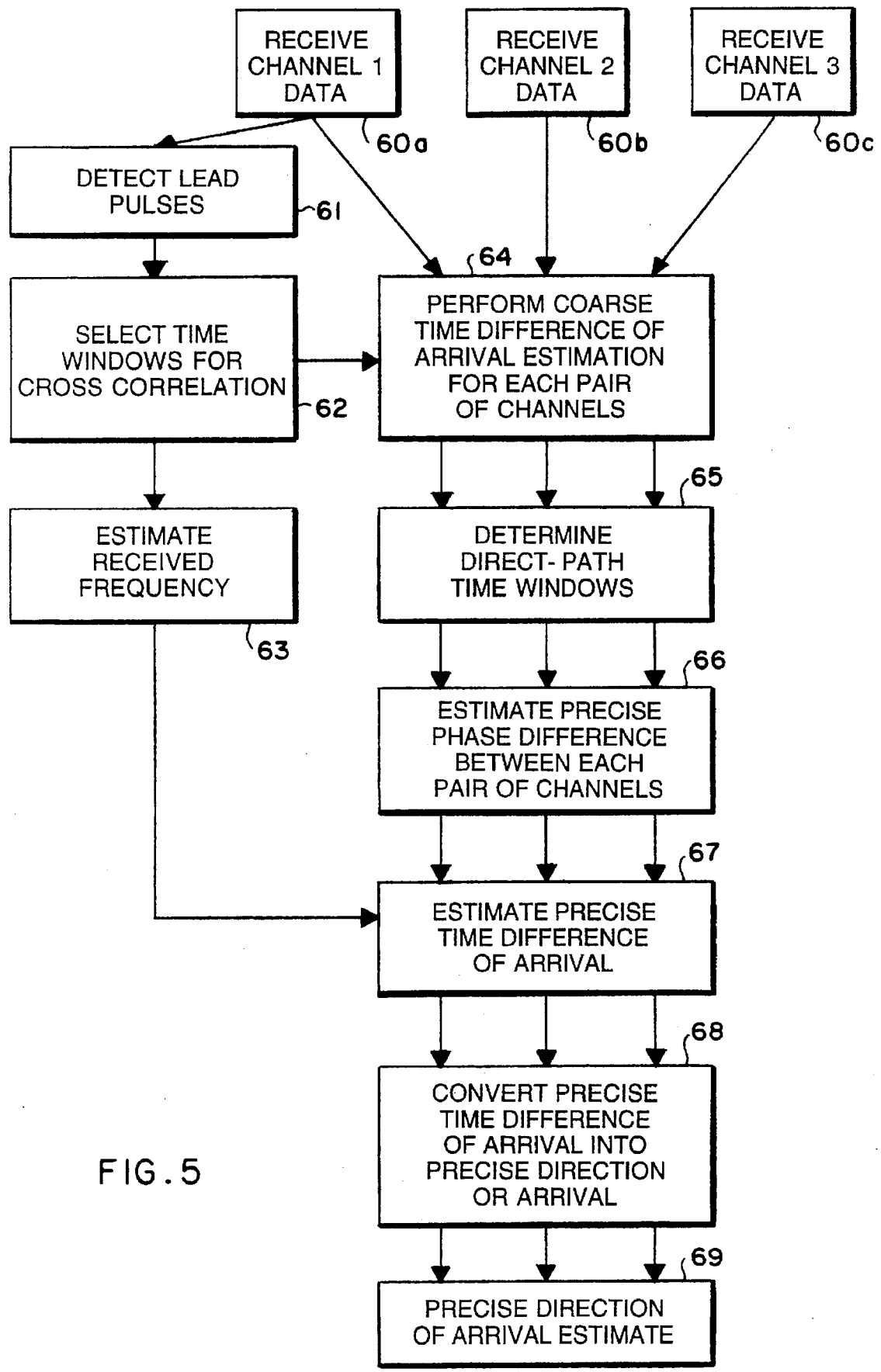
FIG. 5 shows the processing of three-channel (three-receiver) data to obtain a direction-of-arrival estimate.

FIG. 5 is a signal flow chart showing the functioning of the data processing in processor 5. For convenience, only three receive channels 60a–60c of received data are shown. Referring back to FIG. 1, the reply signals for each target are stored in a very large data record in the processor memory 5a.

The system processor 5 retrieves and converts the stored data for three or more channels into a direction-of-arrival estimate in the following manner. First, the lead pulses in each sequence are detected in a first stage 61 which is shown to analyze only one of the three channels for the lead pulse time of arrival information. When the times of arrival of the lead pulses are known, the time windows which contain the other CW pulses can be determined for processing in stages 63 and 64. These time windows which contain the other CW pulses are selected for further processing in stage 62. The initial stages 61 and 62 reduce the amount of data to be processed by subsequent algorithms. The time-windowed data for each of the channels 60a–60c are narrowband filtered and cross-correlated to obtain a coarse time-difference-of-arrival estimate in block 64, to be used to remove the phase ambiguity in the subsequent phase processing stage 66.

The steps following the coarse time-difference-of-arrival estimation 64, are necessary to form a precise time-difference-of-arrival estimate 67. The precise time-difference-of-arrival estimate is sensitive to errors in phase caused by multipath reflections, so the time period between the arrival of the direct-path signals and the arrival of the first multipath signals must be determined in block 65. When the time windows of uncorrupted data are determined, the relative phase between each pair of hydrophone signals is calculated at block 66 using the time windows in block 65. The phase differences are then converted to time-difference-of-arrival estimates. The conversion of the phase differences to time-differences-of-arrival depends upon the received frequencies. Therefore it is necessary to precisely estimate the frequency in block 63 before precise time-difference-of-arrival estimation. When the precise time-difference-of-arrival $\tau_i$ is known for each pair of receive hydrophones 67, the direction-of-arrival for incoming sound 68 can be calculated by the following equation.

The time-delay estimates $\tau_1$, $\tau_2$, and $\tau_3$ are converted to wave vectors $k_x$, $k_y$ by the following formula $$\begin{bmatrix} k_x \\ k_y \end{bmatrix} = \omega \begin{bmatrix} (x_2-x_1) & (y_2-y_1) \\ (x_3-x_1) & (y_3-y_1) \\ (x_3-x_2) & (y_3-y_2) \end{bmatrix}^\dagger \begin{bmatrix} \tau_1 \\ \tau_2 \\ \tau_3 \end{bmatrix}$$

where $\tau_1$ is the time-difference-of-arrival (TDOA) between hydrophones 1 and 2, $\tau_2$ the TDOA between hydrophones 1 and 3, and $\tau_3$ the TDOA between hydrophones 2 and 3. The $x_i$ and $y_i$, are the coordinates in the plane of the hydrophone array of each of the hydrophone elements, and $\omega$ is the angular frequency of the received pulse.

Figure 6:
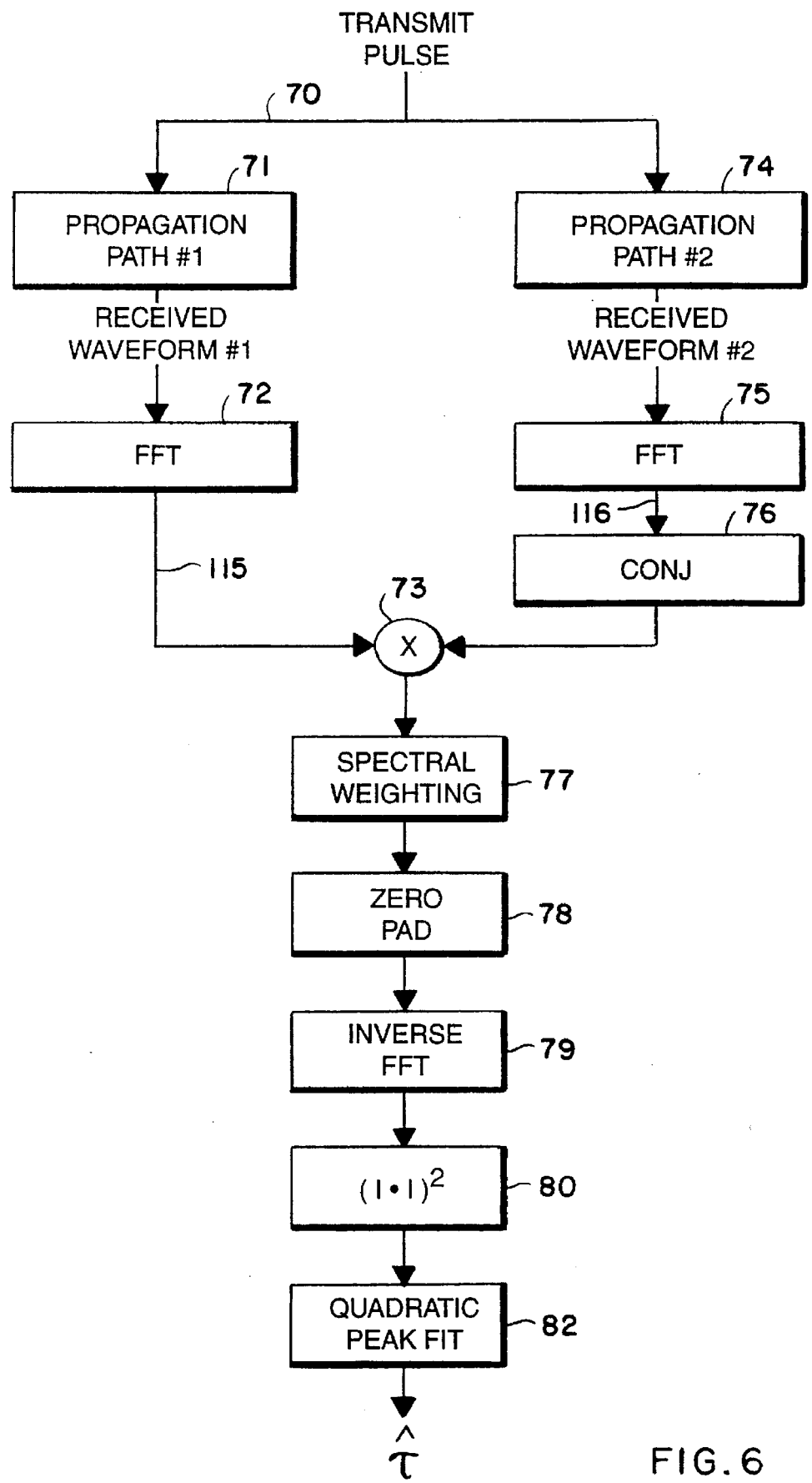
FIG. 6 illustrates, in part, the standard signal processing technique used to obtain a time-difference-of-arrival-estimate with the last two stages being unique to the present invention.

FIG. 6 shows, in blocks 70–81, the current state of the art solution for measuring time-difference-of-arrival and therefore direction-of-arrival. Therefore, no detailed discussion of these blocks is necessary. After a series of time-delay estimates have been obtained, the mean value of the time-delay estimates can be used to provide a more accurate time-delay estimate.

Figure 7:
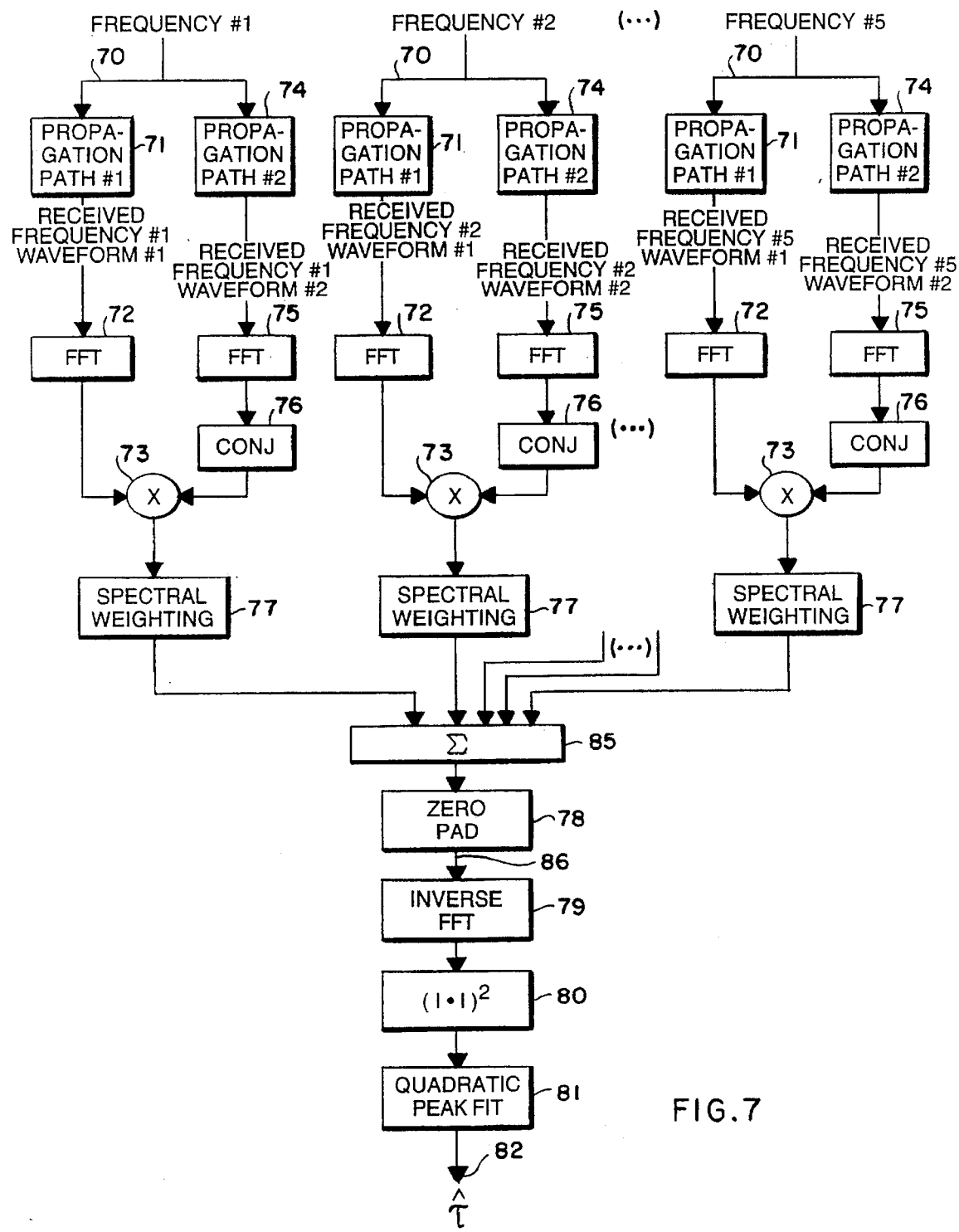
FIG. 7 illustrates the novel technique for estimating time-difference-of-arrival for a series of pulses.

FIG. 7 shows a new technique which yields results superior to the current state of the art technique. For convenience, the blocks of common function for each frequency are labeled with the same reference numeral, consistent with FIG. 6. This technique requires the transmission of a series of CW pulses of stepped frequencies from the transponder. The received signals are digitized and processed using a variation of the generalized cross-correlator method. The steps in the processing are shown in FIG. 7. These steps will be described in greater detail in later figures.

FIG. 4C shows that each reply pulse train S(t)1–S(t)4 begins with a common frequency pulse $f_1$. The processor 5 must first detect these common frequency reply pulses from all transponders 9, 11 that were acoustically interrogated.

Figure 8A:
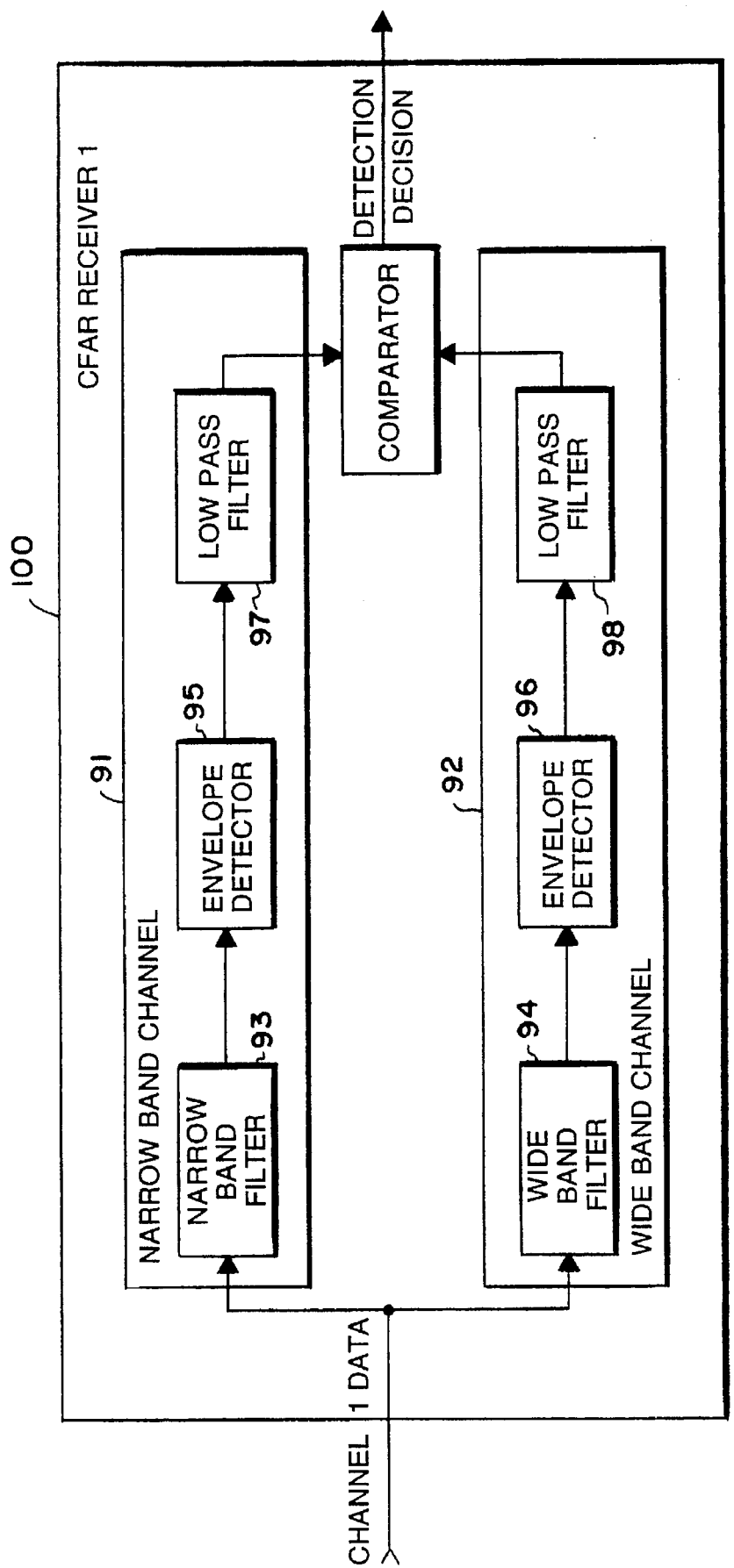
FIG. 8A illustrates the technique for detecting the arrival of lead pulses.

Detection is accomplished by a constant false alarm rate (CFAR) receiver 100. FIG. 8A shows a block diagram of a CFAR receiver 100. Signals from a hydrophone are processed in parallel by two receiver channels, a narrowband channel 91, and a wideband channel 92. Both channels restrict the signal energy to a certain portion of the spectrum by respective narrow and broad bandpass filters 93 and 94. The magnitude of the resulting bandpass signals are measured by envelope detectors 95, 96. The output of the envelope detectors 95, 96 are smoothed by low-pass filters 97, 98, and the narrowband signal magnitude is compared with the wideband signal magnitude in comparator 99 to determine if the reply pulse is present in the hydrophone signal.

When the lead pulse is present, the majority of the signal energy is in the narrowband filter bandwidth, so the output of the narrowband channel 91 and the wideband channel 92, will be very similar. When the lead pulse in not present, the output of the wideband channel 92 will be much larger than the output of the narrowband channel 91.

Figure 8B:
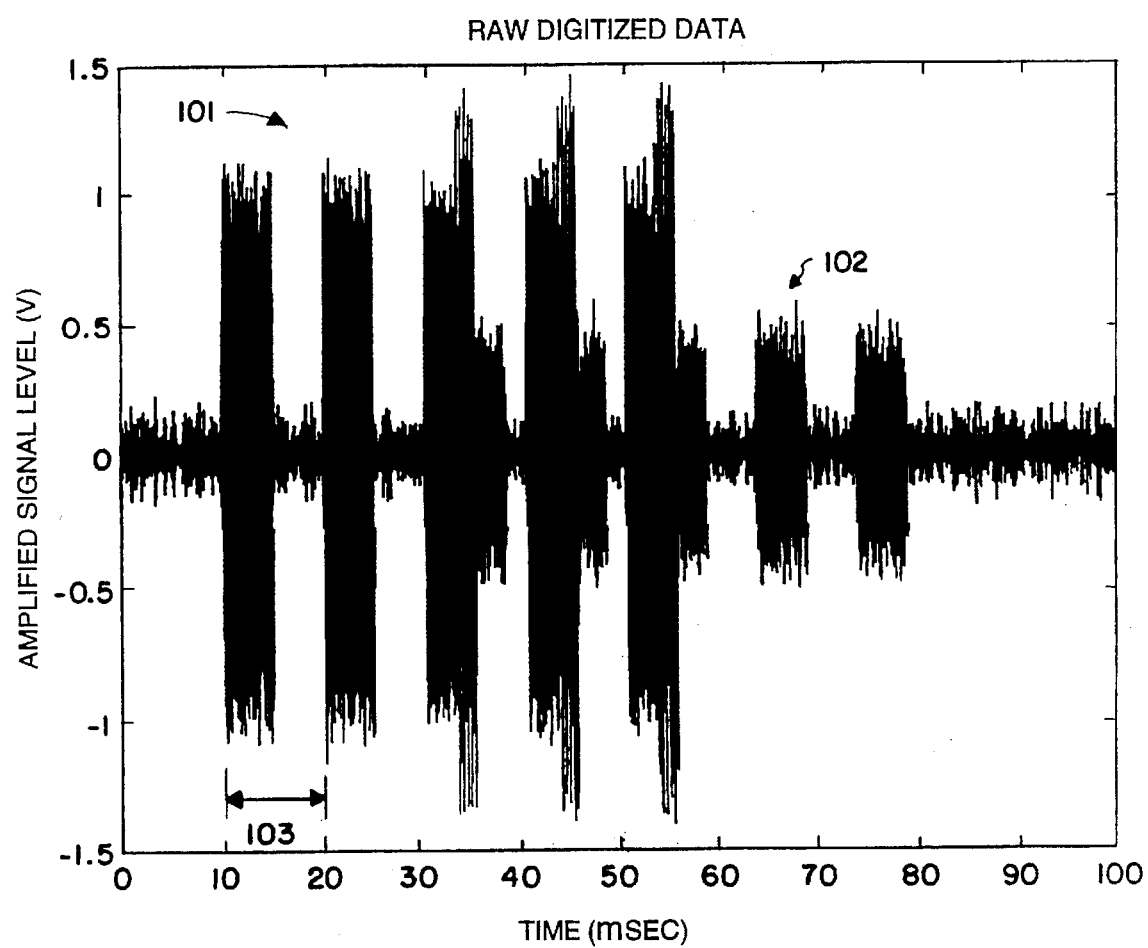
FIG. 8B shows a sample data set consisting of a sequence of two CW pulse trains and noise.
Figure 8C:
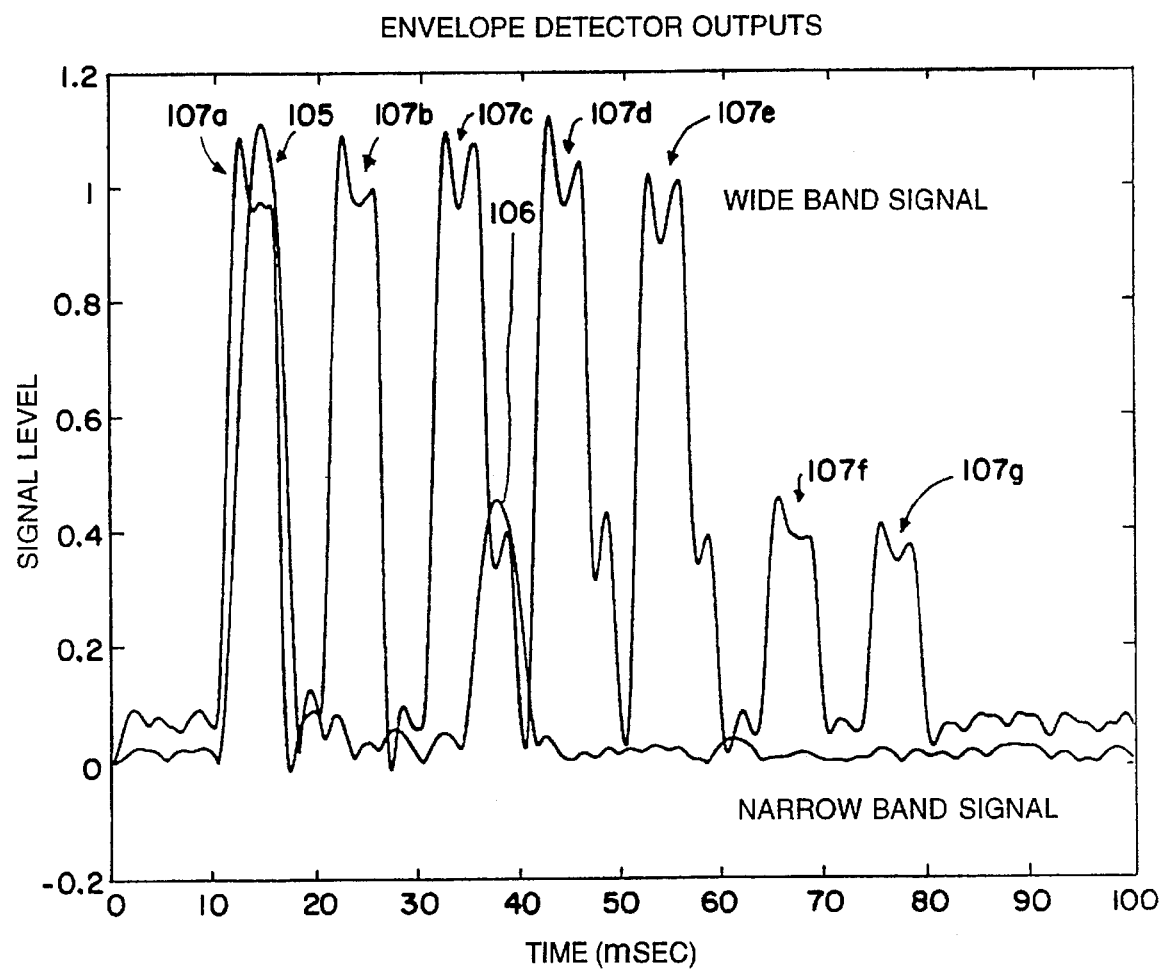
FIG. 8C shows the outputs of the envelope detector for the wideband receiver channel output and for narrowband receiver output.

FIG. 8B shows two pulse trains which arrive at nearly the same time. The first pulse train 101 to arrive has a larger magnitude than the second pulse train 102. The leading pulse in each train has the frequency $f_1$, and the succeeding pulses have frequencies different than $f_1$. FIG. 8C shows the results from the wideband receiver channel and the narrowband receiver channel. The two pulses 105, 106 appear as peaks on the output of the narrowband channel. The wideband channel output peaks 107a–107g appear for all the pulses in the two pulse trains. Lead pulses are detected when the narrowband channel output exceeds a certain fraction of the wideband channel output. The particular fraction of the output can be adjusted to allow for the desired detection probability and false alarm rate. In FIG. 8C, if the comparison threshold is below 0.4, the second lead pulse 106 will be detected. If the comparison threshold is above 0.4, the second lead pulse 106 will not be detected.

Figure 9:
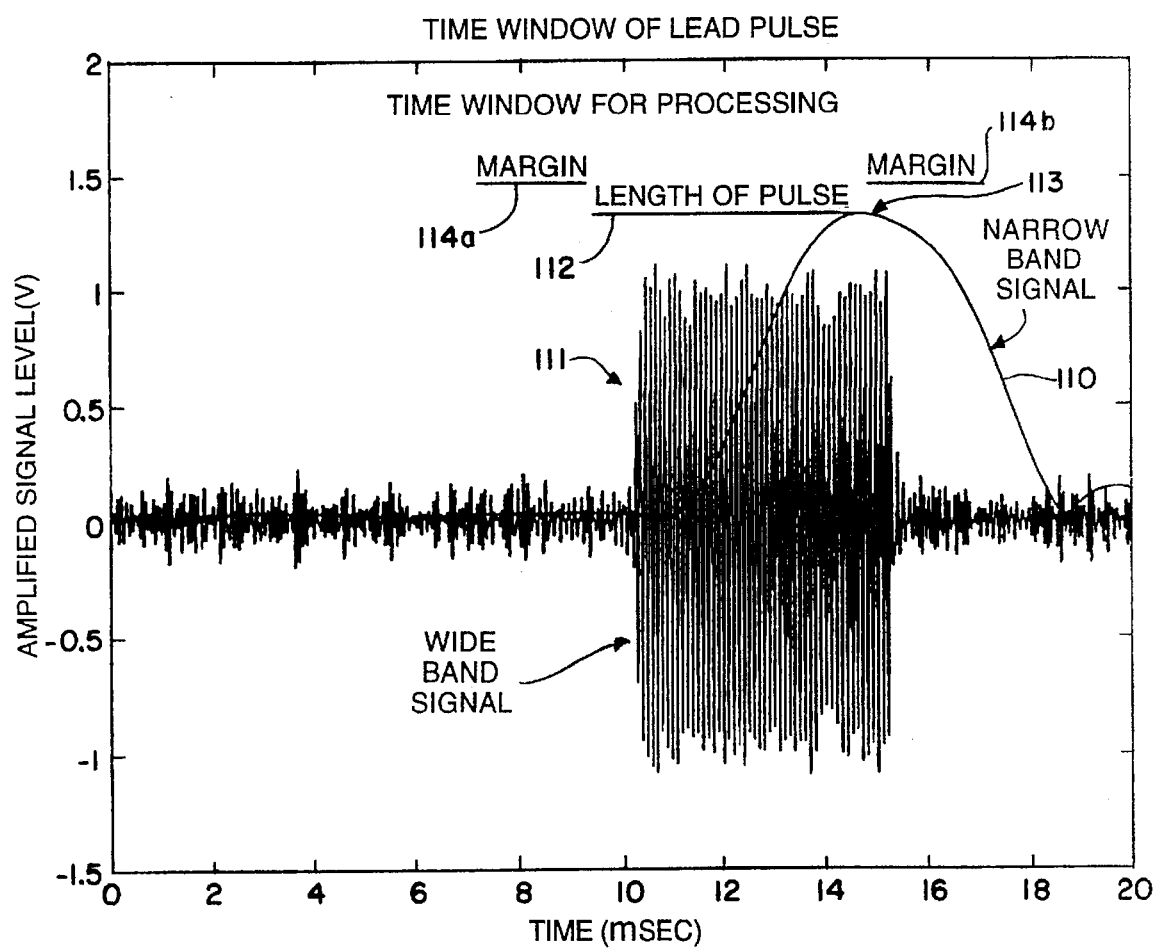
FIG. 9 shows the outputs of the wideband filter and narrowband filter channels.

FIG. 9 shows how the narrowband channel output is used for time windowing of each lead pulse. The narrowband channel output 110 will peak near the end of the lead pulse, 111. The time period when the lead pulse 111 arrived is determined by subtracting the time duration 112 of the lead pulse 111 from the time when the narrowband filter was maximum, shown at numeral 113. Time margins 114a and 114b are added to the beginning and end of the estimated pulse arrival time period 112, and that portion of the sampled data is retained for further processing.

Referring back to FIG. 8b, the time period 103 between the lead pulse and the following pulses in the pulse train is precisely known. When the time window is determined for the lead pulses, the time windows for the following pulses in the train are determined by adding integer multiples of the interpulse period to the lead pulse time window.

Figure 10:
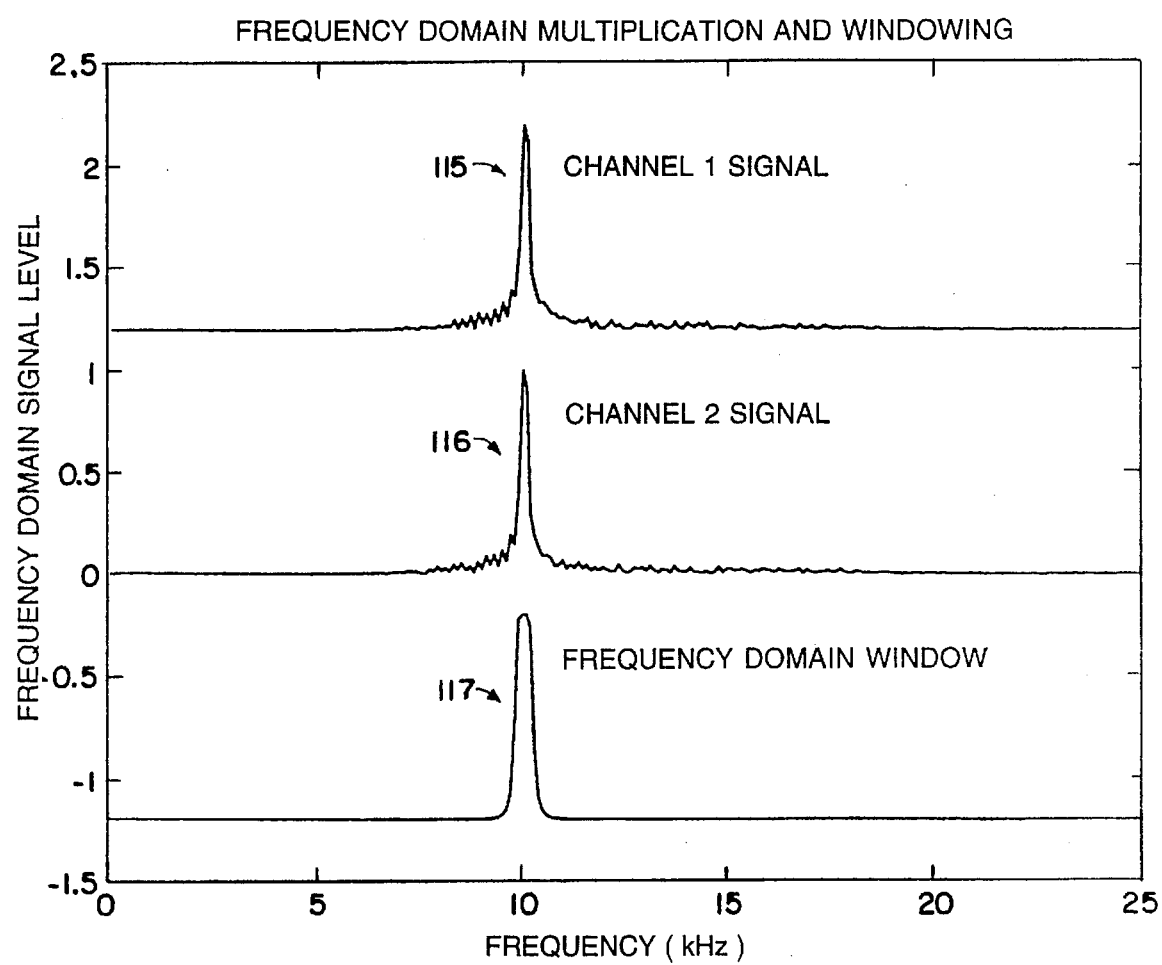
FIG. 10 shows the magnitude of the frequency domain signals of two different receiver channels and the frequency domain windowing for the product of the two signals.
Figure 11:
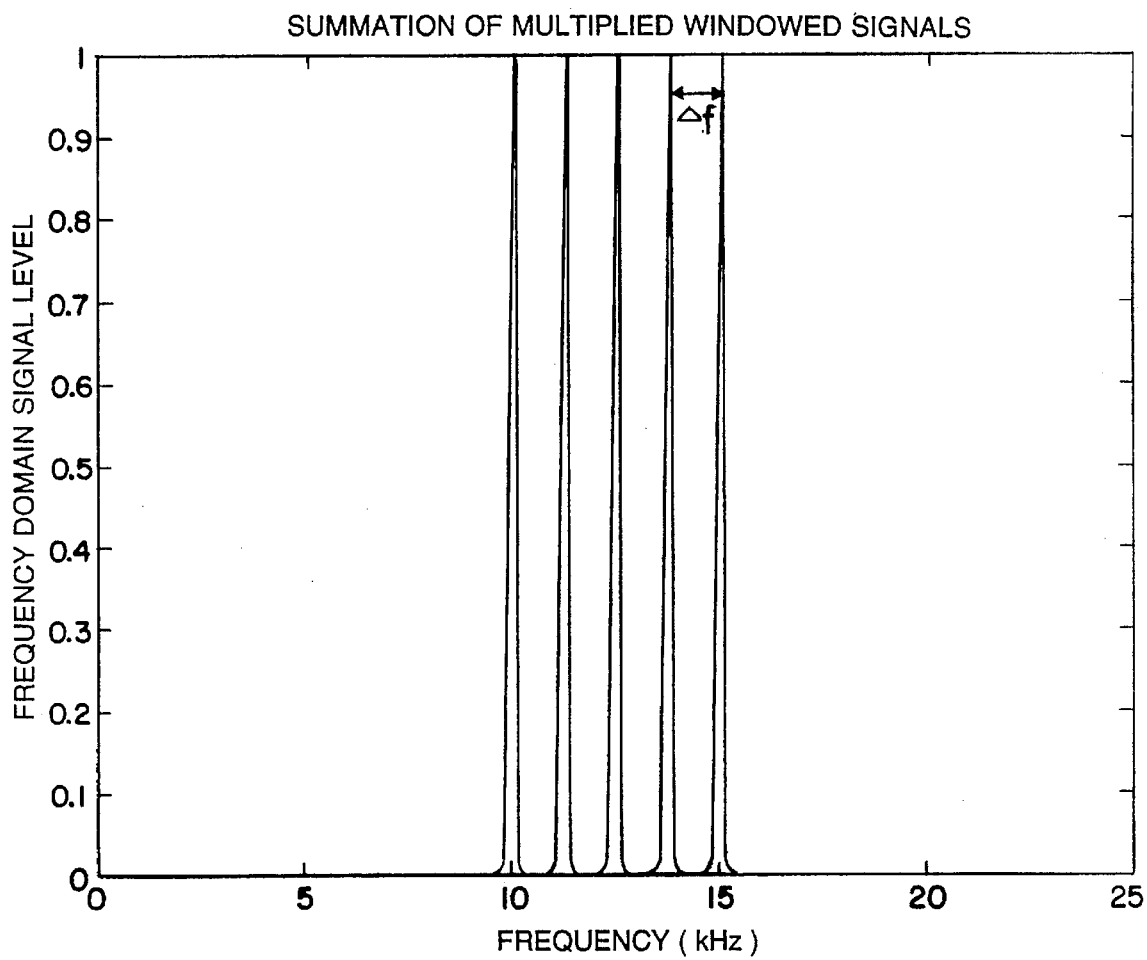
FIG. 11 shows the summation of the results of the narrowband processing for a set of pulses.
Figure 12:
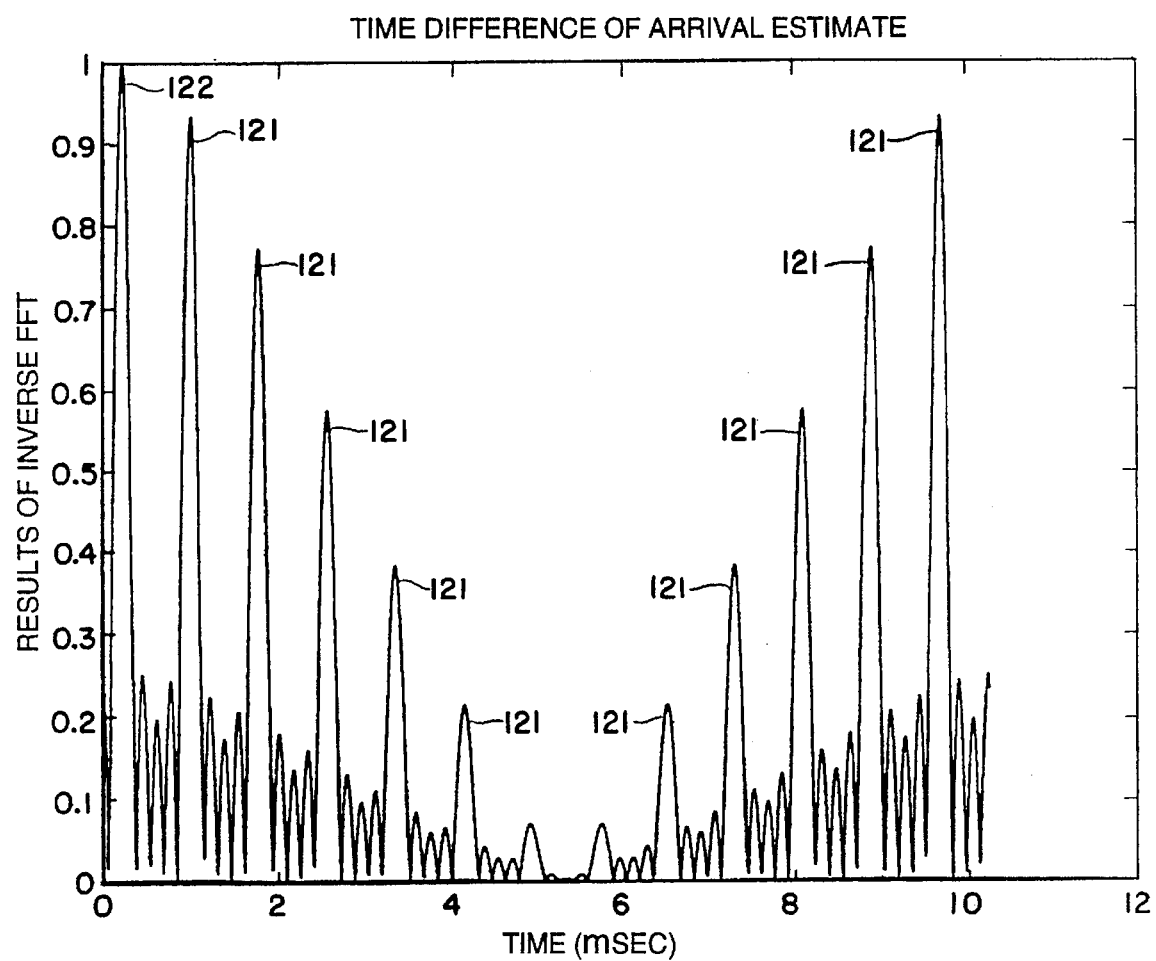
FIG. 12 shows the results of converting the frequency-domain data back to time-domain data.

FIG. 10 aids in analyzing the function of the first stage in the precise time-difference-of-arrival estimation process for two channels of received data. Referring also to FIGS. 6 and 7, the received data on line 70 is first time-windowed in block 71, then Fourier transformed in bock 72 to obtain frequency-domain representations 115, 116 of the data. The frequency domain data 116 in one channel is conjugated at block 76 and multiplied in block 73 by the frequency domain data 115 in the other channel. The product is then spectrally weighted in block 77 to minimize noise in regions in the frequency-domain where the signal is weak. This procedure is repeated for all received frequencies in the pulse train. The results of the processing are summed in block 85 to generate a frequency-domain representation of the time-difference-of-arrival shown in FIG. 11. The frequency-domain representation of the time-difference-of-arrival is zero padded in block 78 for improved time domain resolution and inverse Fourier transformed in block 79 to generate a time-domain time-difference-of-arrival estimate as shown in FIG. 12. Because the frequency-domain representation is nonzero only for small ranges of frequencies separated by $\Delta f$, the resulting time-difference-of-arrival has false peaks 121 separated by $1/\Delta f$. If the set of frequencies are chosen such that:

$$1/\Delta f > d_{max}/2c$$

where $d_{max}$ is the largest separation between two elements in the short baseline array, and c is the speed of sound, there will always be one peak 122 in the time-difference-of-arrival estimate between $-1/\Delta f$ and $+1/\Delta f$ and no ambiguities in the time-difference-of-arrival.

Figure 13:
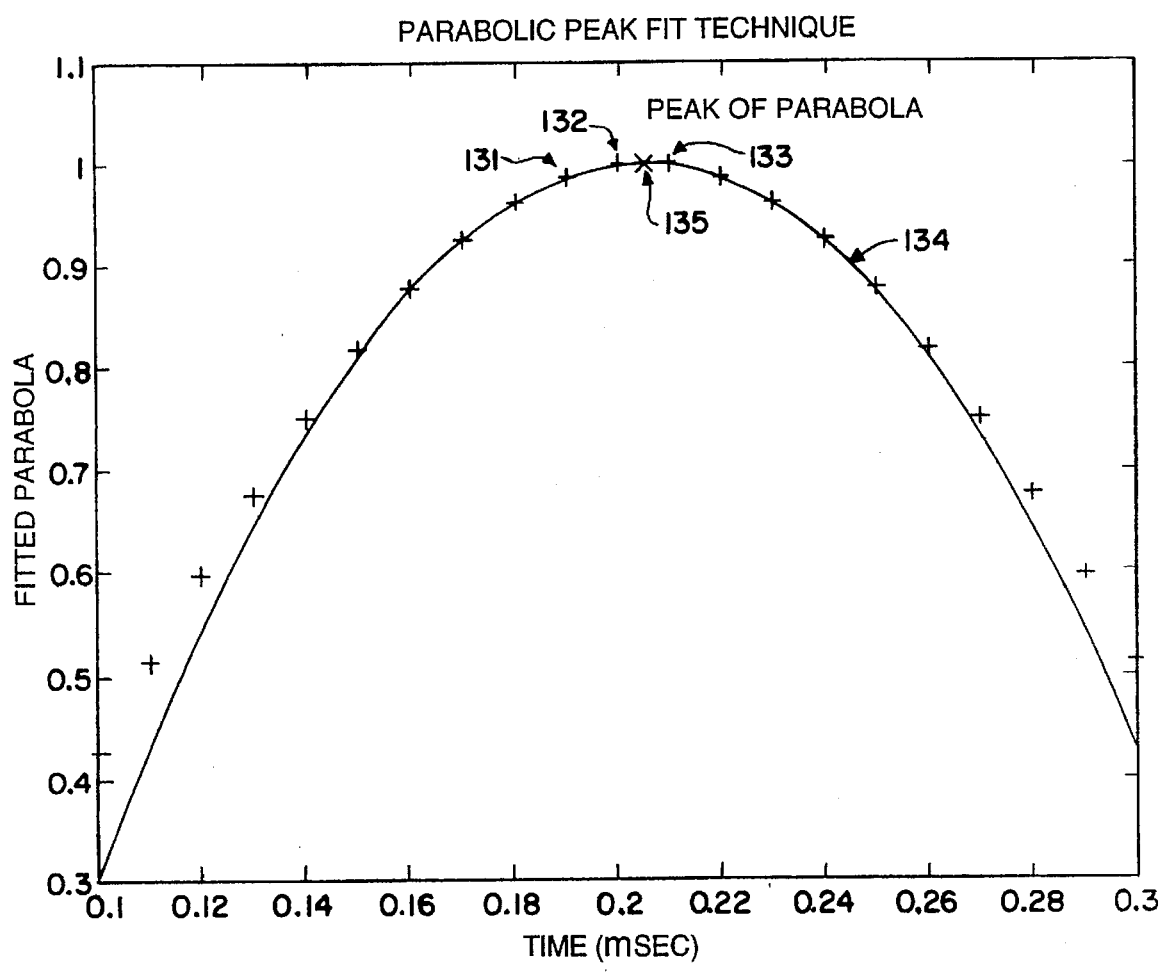
FIG. 13 shows how parabolic curve fitting is used to obtain a more precise time-delay estimate.

Time-difference-of-arrival estimation precision often exceeds the signal sampling rate. It is therefore necessary to interpolate between samples of the time-difference-of-arrival to obtain a more precise time-difference-of-arrival. The most efficient method for interpolation is the parabolic peak fit technique shown in FIG. 13. The three maximum points 131–133 in the discrete time-difference-of-arrival curve are selected. A parabola 134 is fit to those three points, then the peak in the parabola 135, is chosen as the precise time-difference-of-arrival estimate.

Figure 14A:
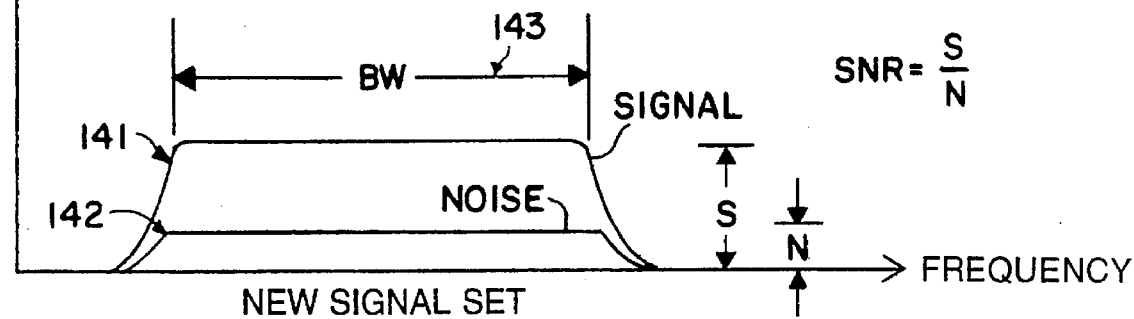
FIGS. 14A and 14B illustrate the SNR improvement obtained using the technique according to the present invention compared to the SNR obtained using a chirp pulse.

FIGS. 14A and B illustrate why this technique produces time-difference-of-arrival estimates which are more precise than those obtained with traditional chirp signaling techniques. FIG. 14A shows the signal energy distribution vs. frequency for a chirp waveform. The signal energy 141 is flat over a certain frequency band, and it tapers at the edges of the band. The signal energy is spread over a wide frequency band, so the energy at any particular frequency is not very high. The chirp waveform must be processed by a wide bandwidth filter in order to maintain its signal components over its entire frequency range. The wideband processing allows wideband noise 142 to remain with the signal. The precision of time-difference-of-arrival estimation $\sigma t$ is proportional to the inverse of the product of the bandwidth (BW) 143 and the square root of the Signal-to-Noise Ratio (SNR), according to the formula:

$$\sigma_t = 1/(BW\sqrt{SNR})$$

The chirp signal has a high bandwidth, but a relatively low SNR.

Figure 14B:
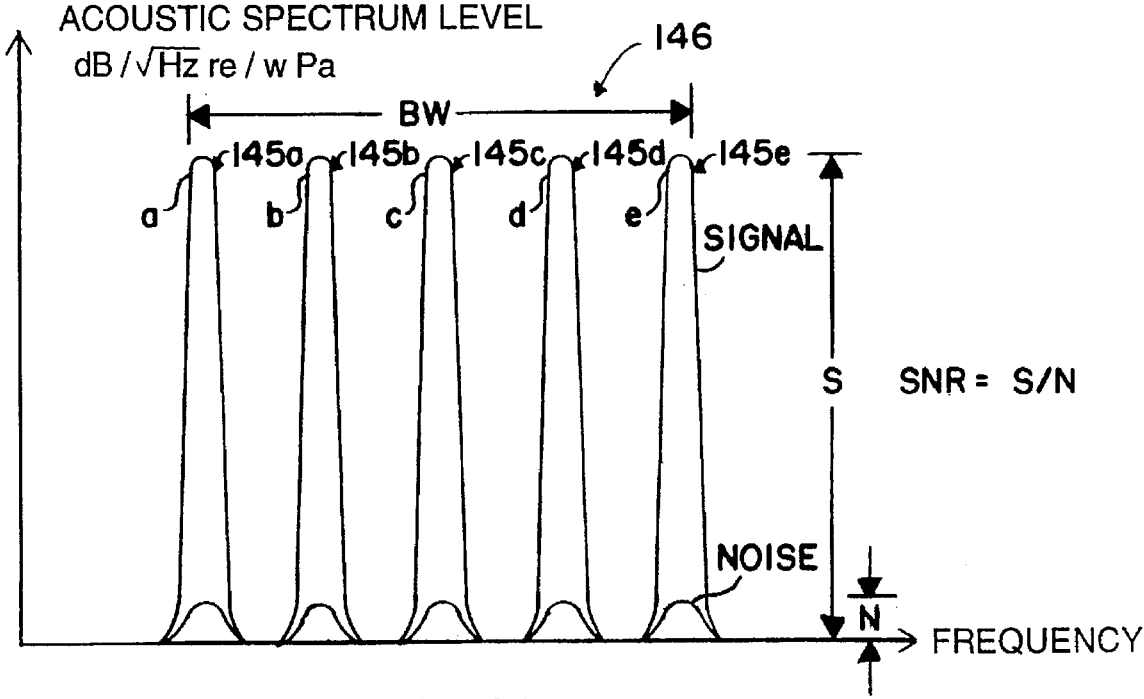

FIG. 14B shows a frequency-domain representation of the train of CW pulses after the appropriate spectral weighing has been applied to each one. These pulses 145a–145e are narrowband signals. Each pulse has its energy concentrated around a particular frequency. At that frequency, the pulse energy S is much higher than the noise energy N. The SNR will be higher than in the case of the chirp waveform. Each pulse has a very narrow bandwidth, but all the pulses in the train are inverse Fourier transformed simultaneously to obtain the time-difference-of-arrival estimates. The bandwidth 146, is the bandwidth across all the different frequency pulses in the train. The precision of time-difference-of-arrival estimation $\sigma_t$ is again expressed by:

$$\sigma_t = 1/(BW\sqrt{SNR})$$

The bandwidth of the two different signal sets are similar, but the SNR is much higher for a train of CW pulses, so the train of CW pulses will yield a superior TDOA estimate.

Figure 15:
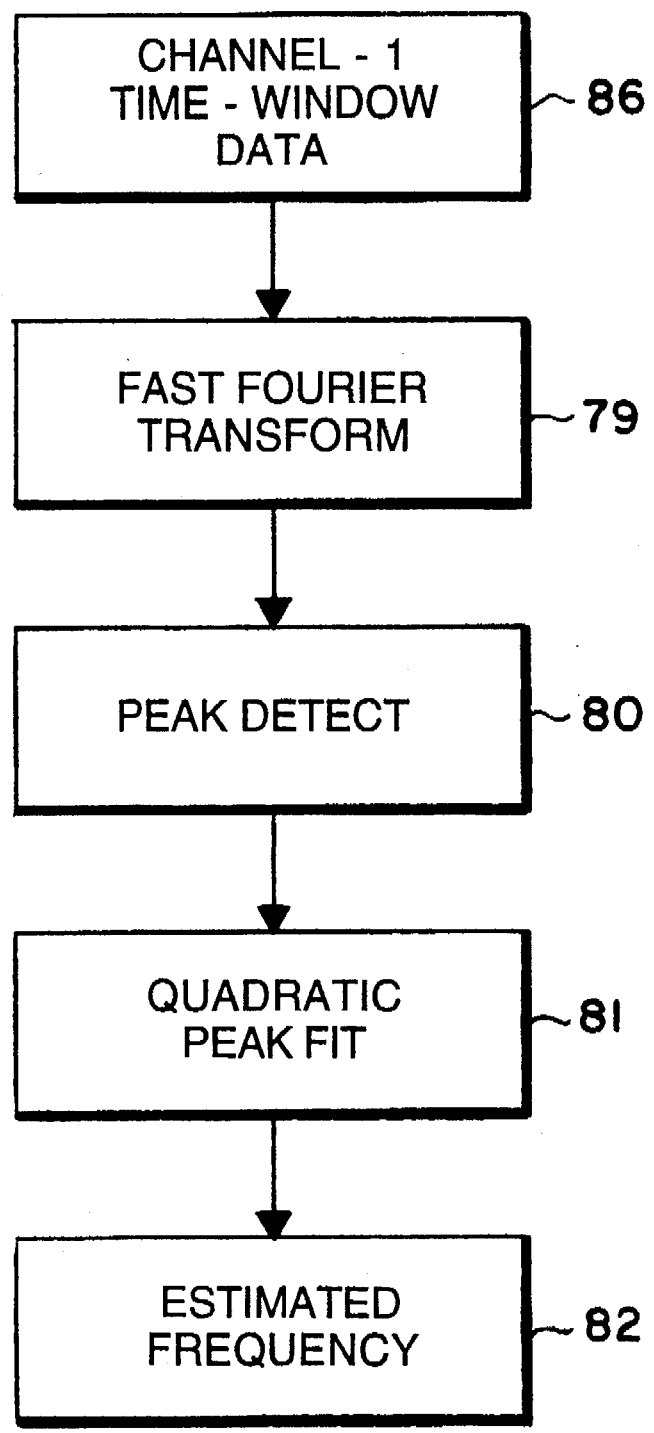
FIG. 15 illustrates the processing used to obtain a precise estimate of frequency for each of the received signals.

Referring back to the master flow chart in FIG. 5, FIGS. 8 through 9 illustrated the detection of lead pulses at block 61. FIGS. 7 and 10-14 show the steps involved in determining the coarse time-difference-of-arrival estimates in block 64. FIG. 15 shows functional blocks for estimating the precise frequency for each of the perceived pulses in a pulse train according to function block 63. FIGS. 16 through 19 show the selection of direct-path time windows for phase processing in block 65. FIG. 20 depicts the conversion of phase-differences between channels into a precise time-difference-of-arrival estimate. FIGS. 21-24 show the timing resolution improvement obtained by using phase processing.

FIG. 15 shows how the precise frequency is estimated for each pulse in the received pulse train (see also FIGS. 6 and 7). The process begins with the time window of data 86 from channel-1. The time domain data is converted to frequency domain data by a fast Fourier transformation 79. The result of the Fast Fourier transformation 79 is then squared in magnitude in block 80 to obtain an estimate of the frequency spectrum of the received signal. The maximum value and two neighboring values are chosen by quadratic peak detection in block 81 where a parabola is fit to those three values in the spectrum. The peak in the parabola (see FIG. 13) is chosen as the maximum of the frequency spectrum, which is then used as the estimated frequency for that pulse.

Figure 16:
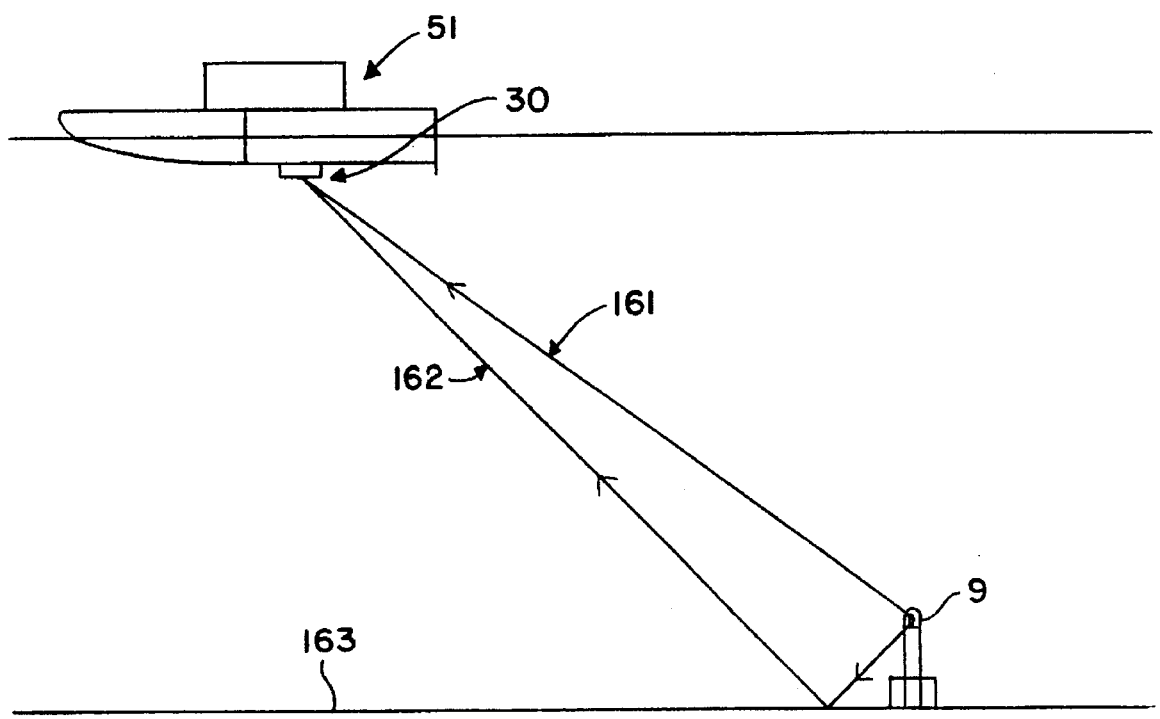
FIG. 16 shows a typical multipath scenario where the first bottom bounce arrives shortly after the direct-path signal.

FIG. 16 shows how multipath reflections can degrade the received signal. A short baseline projector on the short baseline array 30 of a surface ship 51 first interrogates a transponder 9 mounted on the ocean floor 163. The transponder 9 replies with a train of CW pulses. For each pulse, a direct-path signal 161 will arrive first at the short baseline array 30. The direct-path signal will be followed by one or more multipath signals 162 which will degrade the data quality of received signals.

Figure 17:
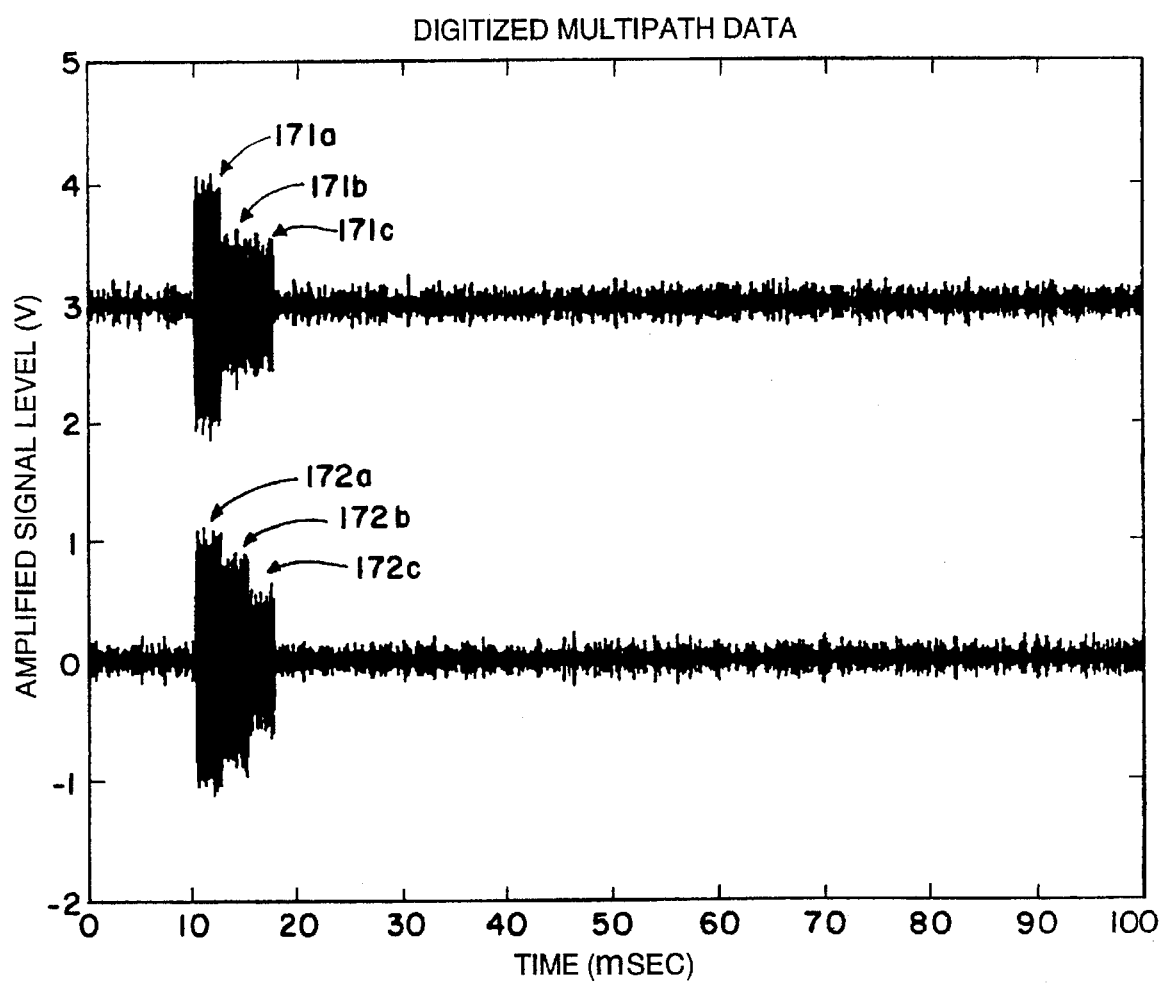
FIG. 17 shows the direct-path and multipath signals in two channels when a reflected-path signal arrives 2.5 msec after the 5 msec direct-path signal.
Figure 18:
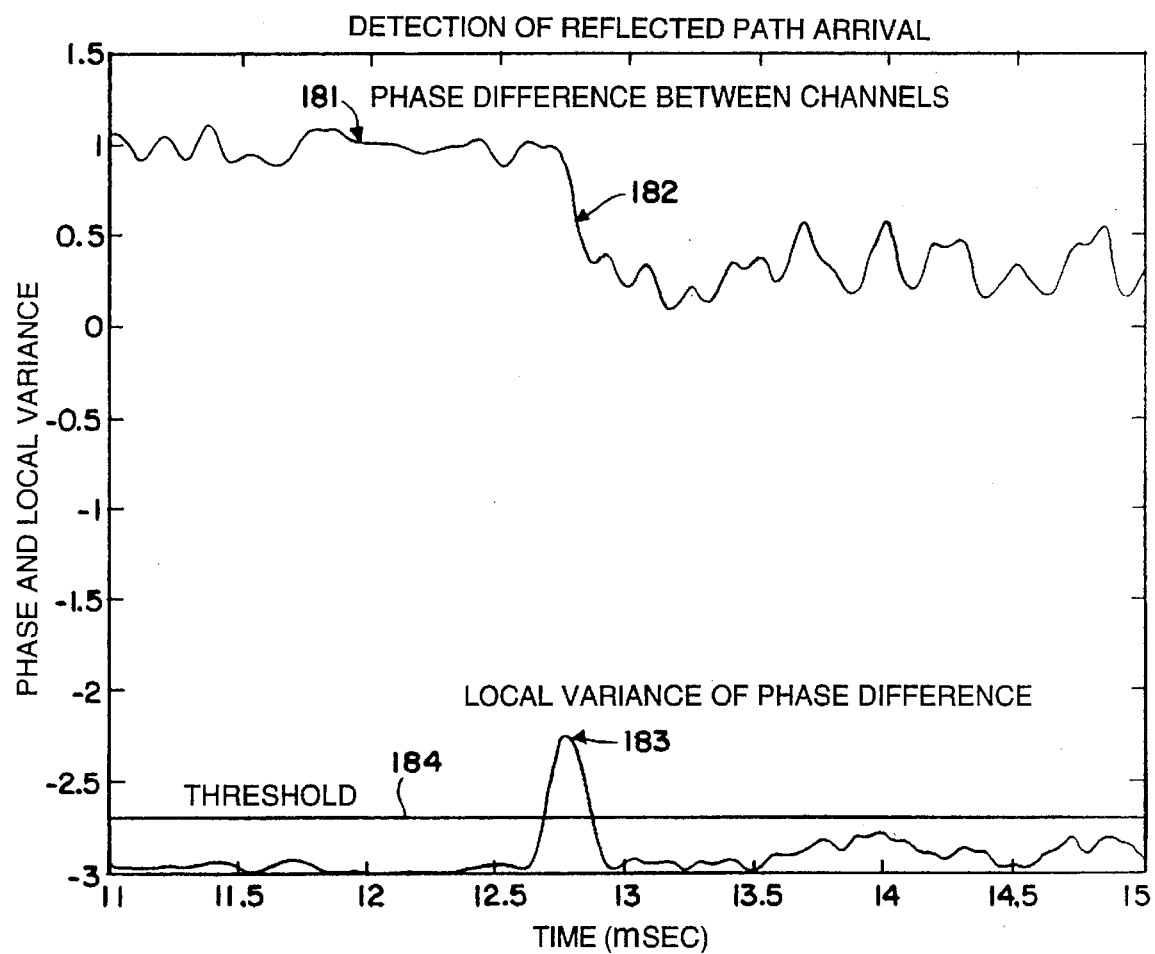
FIG. 18 shows the phase difference between channels at the time of arrival of the reflected-path signal, illustrating the local variance of the phase difference and a threshold crossing technique which can be used to detect the arrival of a reflected-path signal.
Figure 19:
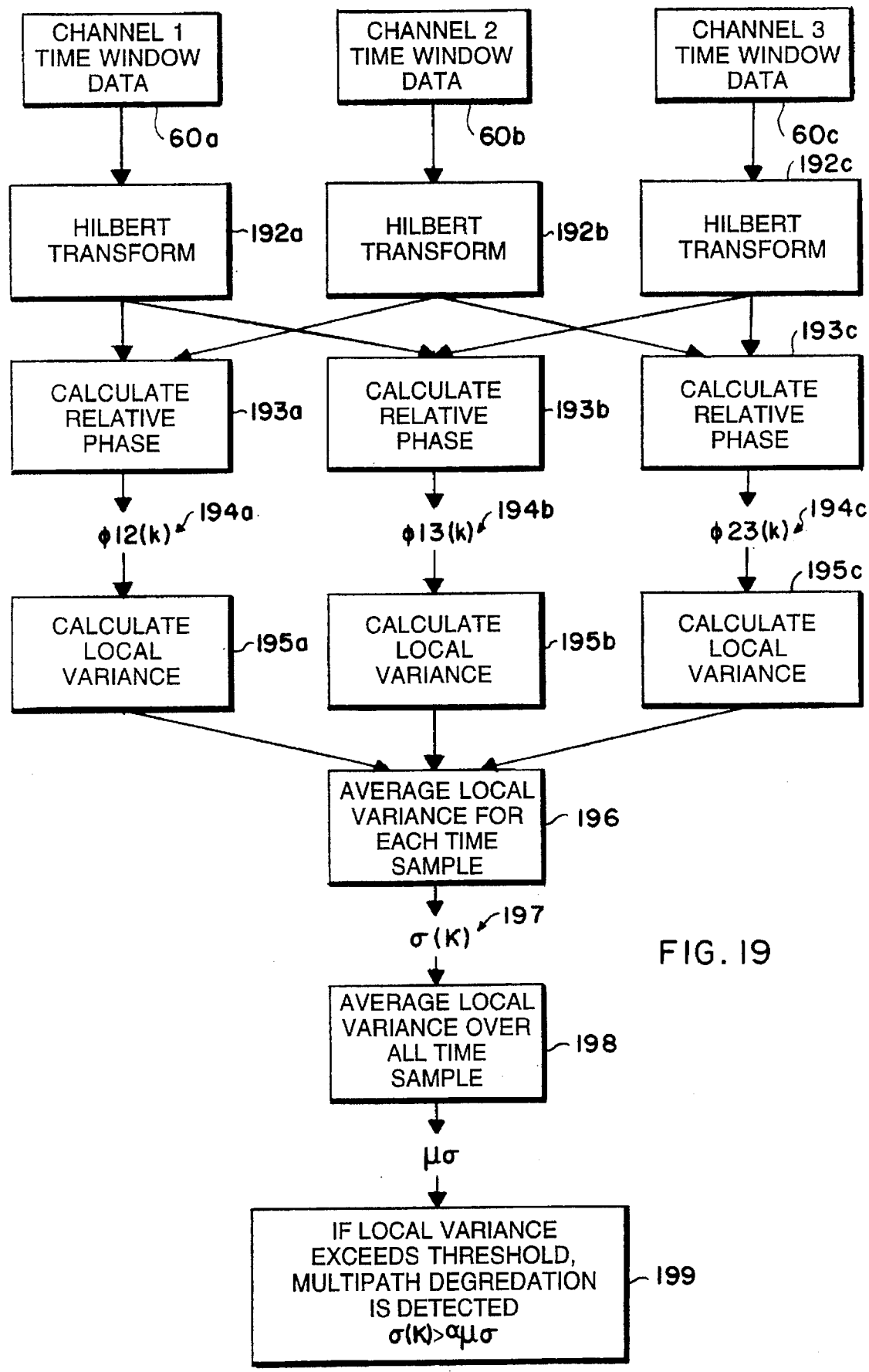
FIG. 19 is a flow chart showing the algorithm for detecting the arrival of the first reflected-path signal.
Figure 20:
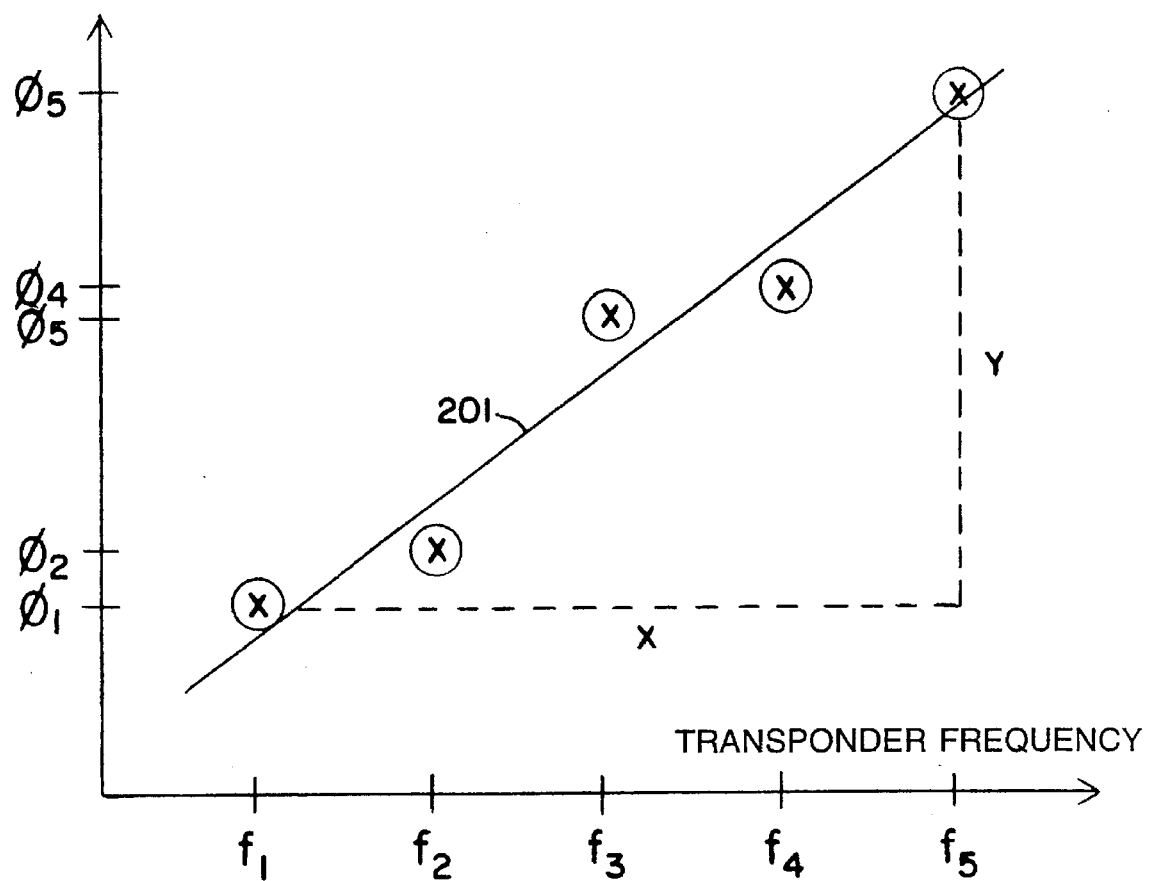
FIG. 20 illustrates the curve fitting used to obtain a precise frequency estimate for each received frequency.

FIGS. 17-19 show a technique for determining the time windows when the direct-path signals arrive in the presence of any multipath signals.

FIG. 17 shows two channels of received data, where the transponder is replying with a 5 msec pulse, and the reflected-path signal arrives 2.5 msec after the direct-path signal. For the first 2.5 msec, only the direct-path signals 171a, 172a will be received by the two hydrophones. During the next 2.5 msec, the direct-path signals and reflected-path signals will both be received by the hydrophones shown in FIG. 17 as signals 171b, 172b, and in the last 2.5 msec, only the reflected-path signal 171c, 172c is received by the two hydrophones. The time window for the direct-path only signals 171a, 172a must be determined in order to ensure that the phase difference estimate between channel 1 and channel 2 is accurate.

FIG. 18 depicts the relative phase based method for determining when the first reflected-path signals have arrived. When the direct-path signals first arrive, the phase difference 181 between channels will stabilize. When reflected-path signals arrive, they will interfere with direct-path signals and cause an abrupt change, shown at 182, in the phase difference between channels. The abrupt change 182 can be detected by estimating the local variance in the phase difference between channels. An abrupt change 182 will cause a peak 183 in the local variance of the phase difference. Thus the arrival of the first reflected-path signal can be determined by the time when the local variance in the phase difference crosses a certain threshold 184.

FIG. 19 provides a flow chart for the detection of the first reflected-path signals for a data set from a three hydrophone array 30. First, the real-valued signals in each channel 60a-60c are Hilbert transformed in blocks 192a-192c to recover their phase. The relative phase difference at 194a-194c between each pair of channels is then calculated in blocks 193a-193c. The local variance in the phase difference between each pair of channels is calculated in blocks 195a-195c and averaged in block 196. The average local variance 197 at each time sample is then averaged over all time samples in block 198, to obtain a mean value μ0 in the local variance in phase between each pair of channels. As determined in block 199, when the value of the local variance exceeds a multiple of the mean value of the local variance, the arrival of the reflected-path signal is detected.

FIG. 20 shows how the phase differences between a pair of hydrophones are converted into time-difference-of-arrival estimates. The average in the phase difference between two hydrophones over the period of direct-path signal arrival is calculated for each frequency in the pulse train. The phase difference values are unwrapped in phase using information obtained from coarse time-delay estimation to obtain a set of phase differences $\phi_1$–$\phi_5$ which correspond to the estimated frequencies $f_1$–$f_5$. A best-fit line 201 is chosen for the (frequency, phase) points. The slope of the line is then converted to a precise time-difference-of-arrival estimate $\Delta t$ using the following formula:

$$\Delta t = \frac{d\phi/df}{2\pi}$$

Figure 21:
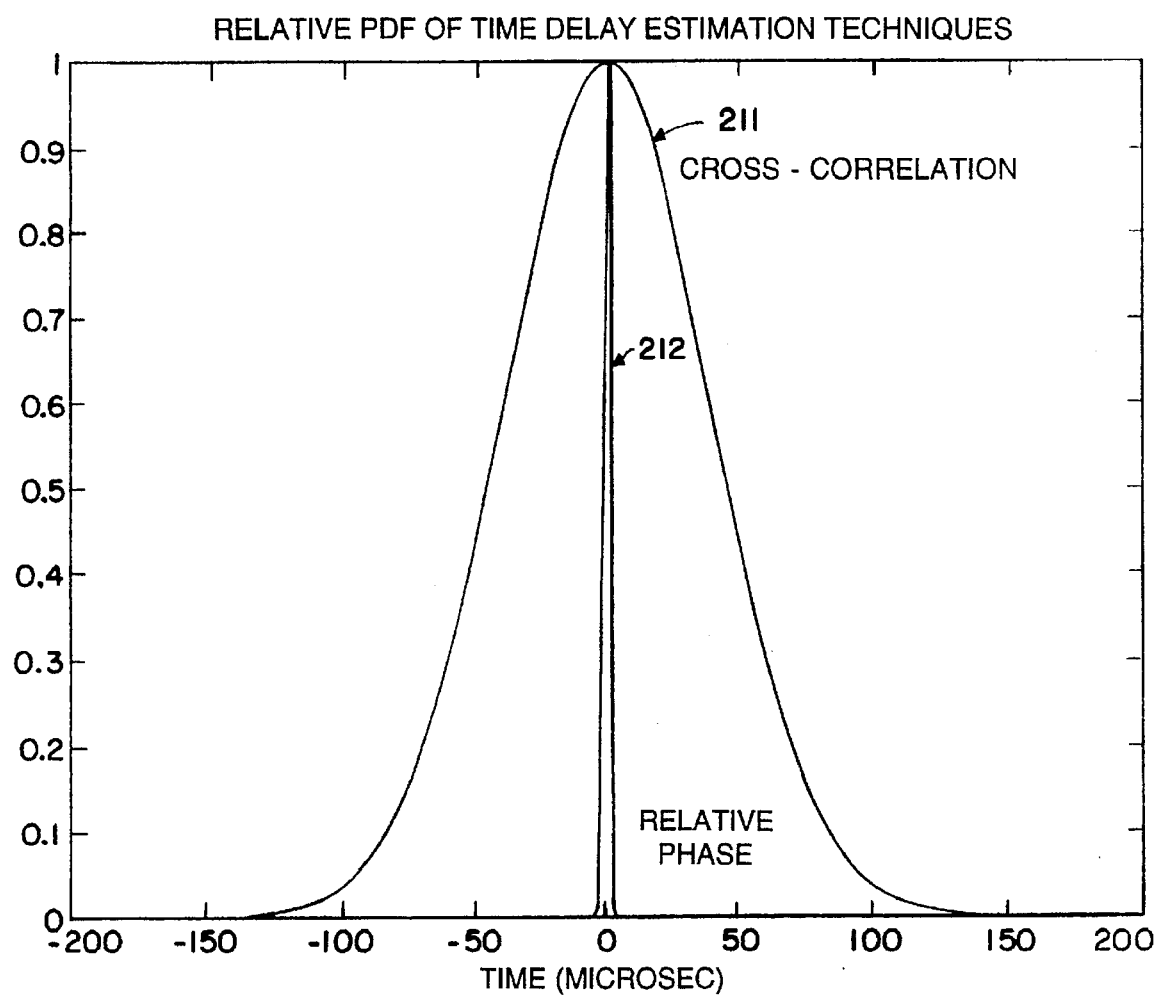
FIG. 21 shows the relative probability density functions for a time-delay estimate based on the cross-correlation technique (the coarse time-delay estimate), and for a time-delay estimate based on the relative phase between channels (the precise time-delay estimation technique).

FIG. 21 shows the differences between the estimation of time delay 211 using cross-correlation and the relative phase difference 212 between channels. The phase technique has a much smaller variance, but the estimates are ambiguous. As suggested supra, a coarse time-delay estimate must be obtained and used to select the correct ($2\pi$) phase increment to add to the phase. If the time-delay estimate is within (½f) of the correct value, the correct phase delay estimate will be chosen, otherwise the phase difference will be in error by $2\pi$ or more.

Figure 22:
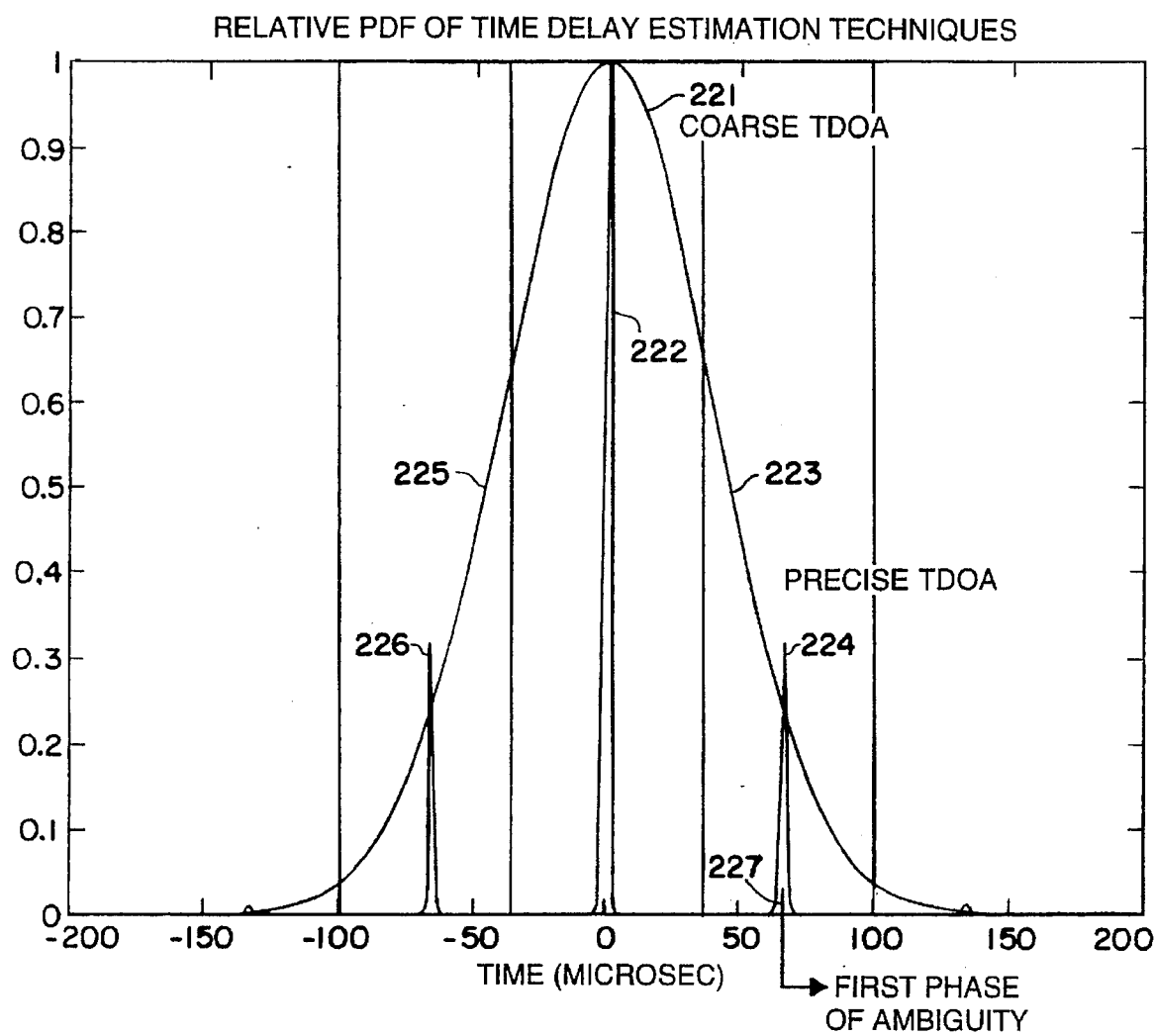
FIG. 22 shows the results obtained for a poor coarse time-difference-of-arrival estimate and a precise time-difference-of-arrival estimation.

FIG. 22 shows how the process occurs for a 15 kHz signal when the phase difference between two channels leads to a precise time-difference-of-arrival estimate near 0 μsec. When the coarse time-delay estimate 221 is between –½f and ½f, i.e., –33.3 and +33.3 μsec, no multiple of $2\pi$ is added to the phase estimate, and the resulting composite time-delay estimate 222 will be very near 0 μsec. When the time-delay estimate is between 33.3 and 100 μsec, shown at 223 in FIG. 22, $2\pi$ is added to the phase estimate, and the resulting composite time-delay estimate 224 is very near 66.7 μsec. When the time-delay estimate is between –33.3 and –100 μsec, shown at 225 in FIG. 22, $2\pi$ is subtracted from the phase estimate, and the resulting composite time-delay estimate 226 is very near –66.7 μsec.

Therefore, after precise phase delay estimation, the distribution of the time-delay estimate takes on a distribution that is almost discrete in nature. This process does reduce the standard deviation of the coarse time-difference-of-arrival estimation, but the amount of improvement depends upon the carrier frequency and the standard deviation of the original time-delay estimate.

Figure 23:
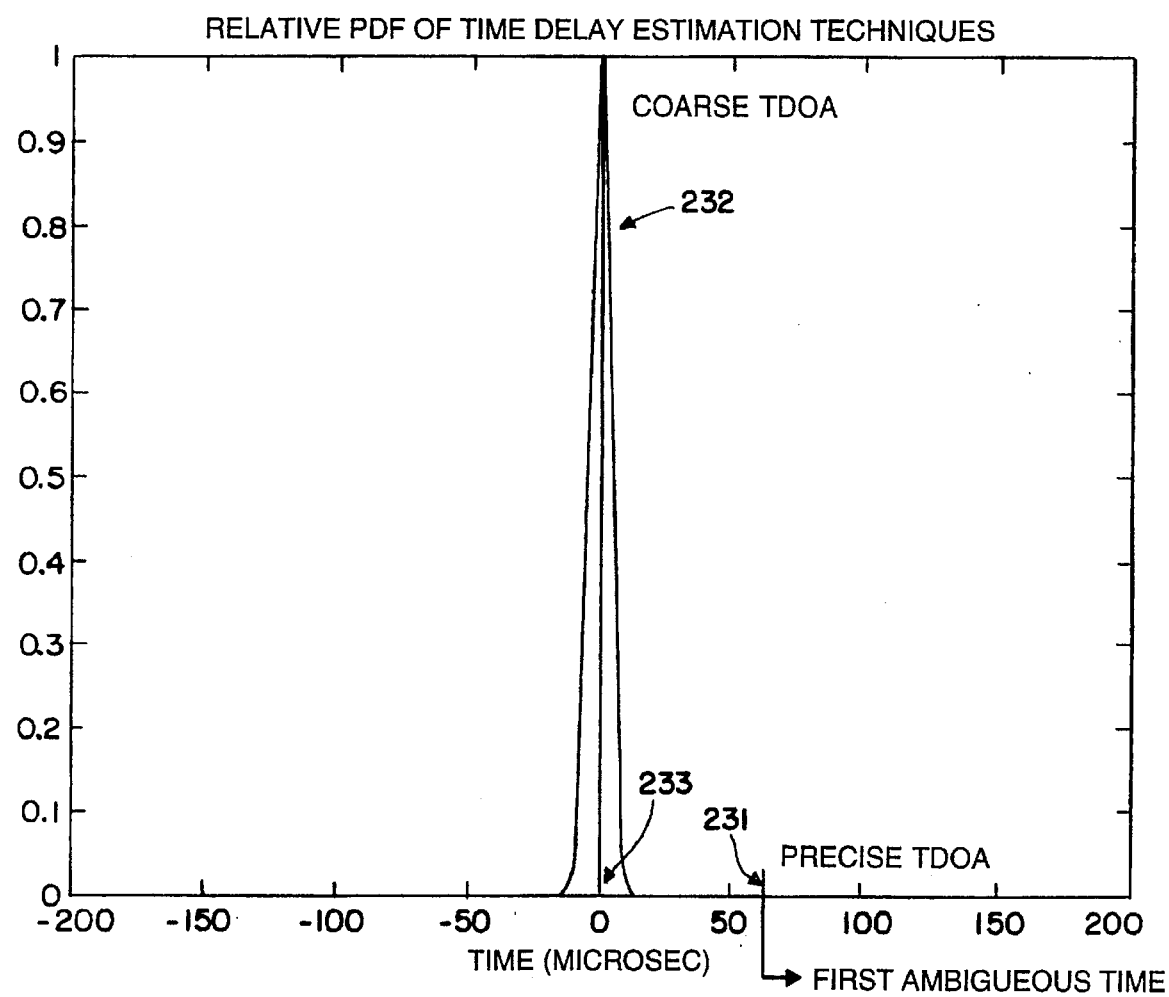
FIG. 23 shows the results obtained from a good coarse TDOA estimate after precise time-difference-of-arrival estimation.

FIG. 23 illustrates that when the first ambiguous time 231 is several standard deviations from the center of the coarse time-difference-of-arrival distribution 232, the composite time-delay estimate will look like the relative phase difference 233, and the standard deviation of the time-delay estimate will be very small. In FIG. 22, when the first phase ambiguity 227 is approximately equal to the standard deviation of the coarse time-delay estimate 221, 223, 225, the new time-delay estimate 222, 224, 226, will have almost the same variance as the original coarse time-delay estimate.

Figure 24:
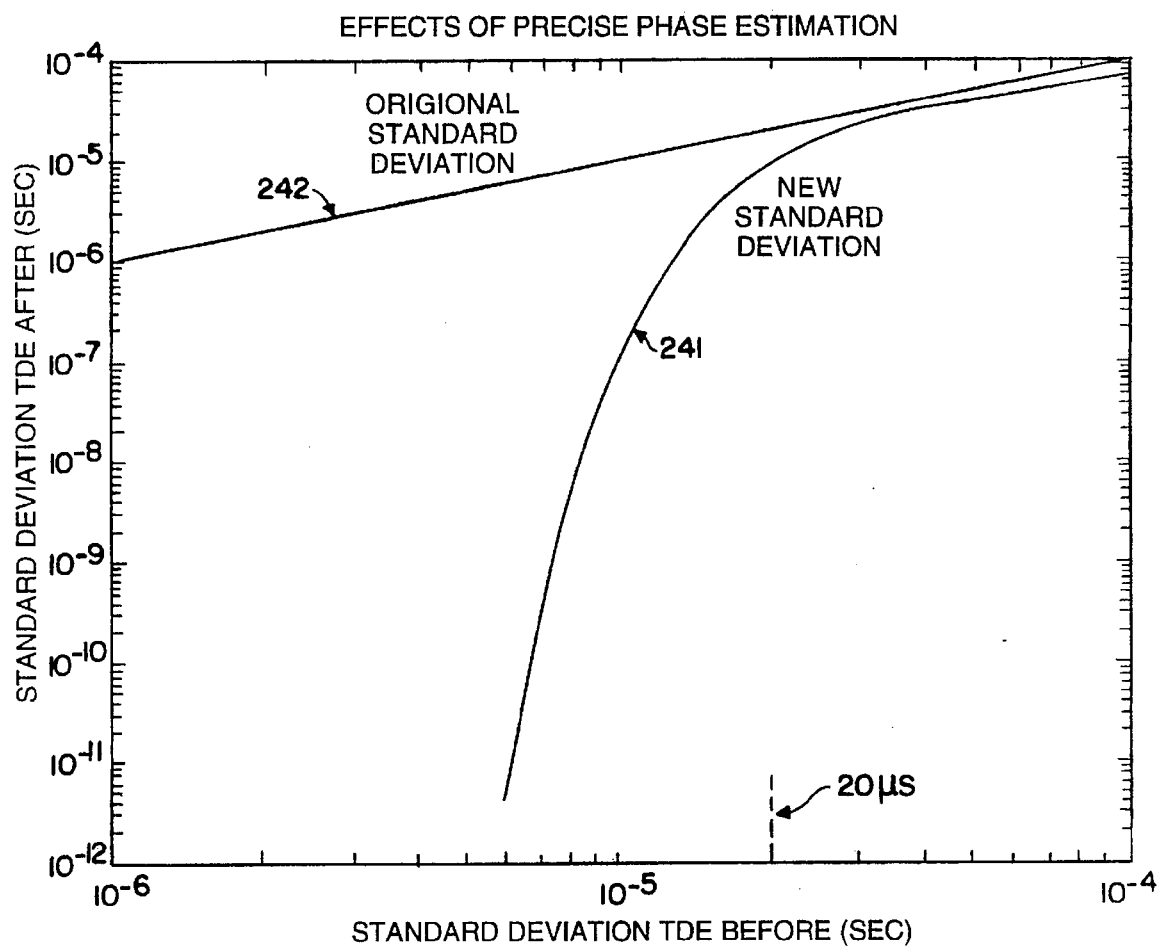
FIG. 24 illustrates the performance of the composite time-difference-of-arrival estimation as a function of the precision of coarse time-difference-of-arrival estimate.

FIG. 24 shows the standard deviation of the time delay both before and after precise time-delay estimation using the phase information. Very little improvement is obtained from the precise time-delay estimation 241, until the standard deviation of the coarse time-delay estimation 242, is below 20 microseconds for pulses with a 66.7 microsecond period. After this point is reached, the precise phase base time-delay estimation greatly improves the standard deviation of the coarse time-delay estimate.

We claim:

1. A navigation system employing real-time estimation of the positions of multiple cooperative targets, comprising:

transmitter means for transmitting an interrogation signal for detection by a plurality of transponders or responders each of which, responsive to detection of the interrogation signal, transmits a reply signal having at least one continuous wave frequency component;

first receiver means comprising a plurality of receiving elements spaced apart a distance in the range of 0.5 to 10 wavelengths of the lowest frequency component of the reply signals, said first receiver means comprising direction-of-arrival measurement means including means for measuring the phase difference of the received reply signal between each pair of receiving elements and producing direction-of-arrival estimates, whereby said first receiver means includes spectral and spatial means to resolve ambiguities;

second receiver means for the measurement of round-trip travel times providing distance-to-target estimates for each target; and computer means for collecting the outputs to said first and second receiver means for determining the position of each target relative to said receiving elements.

2. The navigation system as claimed in claim 1, wherein said direction-of-arrival measurement means produces a fine time-difference-of-arrival estimate which is ambiguous only by an integral number of time periods of the reply signal frequency component being received, and said first receiver means further comprises:

means for producing a coarse time-difference-of-arrival estimate using time-of-arrival estimates as between pairs of receiving elements;

means for comparing said coarse and fine time-difference-of-arrival estimates and determining the number of said time periods in the difference therebetween; and means for correcting said fine time-difference-of-arrival ambiguity by said number of said time periods in said difference.

3. The navigation system as claimed in claim 2, wherein the reply signal from each transponder or responder includes a series of spaced bursts of continuous wave frequencies, each burst in said series being of a frequency different than all other bursts in the series, and wherein said means for producing a coarse time-difference-of-arrival estimate comprises means for cross-correlating the series of spaced bursts in each reply signal.

4. The navigation system as claimed in claim 3, wherein said first receiver means includes a plurality of narrowband filters for processing separately each said burst of continuous wave frequency.

5. The navigation system as claimed in claim 3, wherein the bursts of continuous wave frequencies in the series of bursts from each transponder or responder are transmitted in a sequential order different from the bursts in the other transponders or responders, and wherein said first receiver means comprises burst sequence detection means for uniquely identifying the series of bursts of continuous wave frequencies from each transponder or responder.

6. The navigation system as claimed in claim 5, wherein the first burst of continuous wave frequency transmitted by each transponder or responder, responsive to receiving an interrogation signal, is common with that of all other transponders or responders and defines a lead burst for each series of bursts.

7. The navigation system as claimed in claim 1, wherein said first receiver means comprises three said receiving elements spaced apart a distance in the range of 0.5 to 10 wavelengths of the lowest frequency components of the reply signals and arranged in an equilateral triangle configuration.

8. The navigation system as claimed in claim 1, wherein:

each transponder or responder transmits a reply signal comprised of a series of gated continuous wave pulses of different frequencies;

said first receiver means includes means for cross-correlating the received series of pulses for each pair of receiving elements, to form a coarse time-difference-of-arrival estimate; and said direction-of-arrival measurement means produces a fine time-difference-of-arrival estimate which is ambiguous only by an integral number of time periods of the continuous wave pulse being received;

said fine time-difference-of-arrival estimate and said coarse time-difference-of-arrival estimate are processed to produce precise target time-difference-of-arrival information.

9. The navigation system as claimed in claim 6, wherein said first receiver means comprises a common-frequency burst detector for identifying the lead burst in each said series which is at a frequency common with the lead burst frequency of all other transponders or responders.

10. The navigation system as claimed in claim 9, wherein said common-frequency burst detector comprises:

a narrowband receiver channel tuned to the frequency of the lead bursts;

a wideband receiver channel tuned to the frequency of the lead bursts;

an envelope detector in each of said channels; and a comparator for comparing the outputs of said envelope detectors, said comparator providing an output only when the magnitude of the output of said narrowband channel exceeds a predetermined fraction of that of said wideband channel, thereby indicating the presence of a lead burst.

11. The navigation system as claimed in claim 10, wherein said predetermined fraction is in the range of 0.6/1 to 1/1.

12. The navigation system as claimed in claim 3, wherein said first receiver means comprises frequency estimator means for determining the frequency of each burst in the series of received bursts, said frequency estimator means comprises:

a time-window for selecting a time window of data from a frequency burst in said series of bursts;

a converter for converting the selected time window of data to frequency domain data using a fast Fourier transform;

means for squaring the magnitude of the frequency domain data to obtain an estimate of the frequency spectrum of the selected burst;

a peak detector for fitting a parabola function to three values in the frequency spectrum, the maximum value and two neighboring values; and means for identifying the peak in the parabola as the maximum of the frequency spectrum and corresponding to the estimated frequency for the selected burst.

13. The navigation system as claimed in claim 1, wherein said first receiver means comprises direct/indirect path detection means for distinguishing direct path signals directly from a transponder or responder and indirect path signals which are received from a transponder or responder from along a path which is not direct from the transponder or responder, said direct/indirect path detection means comprising:

means for detecting an abrupt phase difference between reply signals received by two different receiving elements; and a threshold detector for providing an output upon detection of said abrupt phase difference between reply signals received by said two different receiving elements, indicating the arrival of the indirect path signal.

* * * * *